United States Patent
Goetz

(10) Patent No.: US 10,850,959 B2
(45) Date of Patent: Dec. 1, 2020

(54) STORAGE AND RETRIEVAL DEVICE FOR PARALLEL OPERATION OF A HIGH-BAY WAREHOUSE AND OPERATING METHOD THEREFOR

(71) Applicant: BAUMUELLER NUERNBERG GMBH, Nuremberg (DE)

(72) Inventor: Fritz Rainer Goetz, Kirchheim unter Teck (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 88 days.

(21) Appl. No.: 16/080,033

(22) PCT Filed: Feb. 27, 2017

(86) PCT No.: PCT/DE2017/100154
§ 371 (c)(1),
(2) Date: Aug. 27, 2018

(87) PCT Pub. No.: WO2017/144054
PCT Pub. Date: Aug. 31, 2017

(65) Prior Publication Data
US 2019/0062058 A1 Feb. 28, 2019

(30) Foreign Application Priority Data

Feb. 26, 2016 (DE) .......................... 10 2016 203 134
Apr. 25, 2016 (DE) .......................... 10 2016 206 962
(Continued)

(51) Int. Cl.
*B66F 9/065* (2006.01)
*B66F 9/07* (2006.01)
(Continued)

(52) U.S. Cl.
CPC .............. *B66F 9/0655* (2013.01); *B65G 1/04* (2013.01); *B65G 1/0478* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2,837,224 A | 6/1958 | Rosen | |
| 9,315,320 B2 | 4/2016 | Kawano | |
| 2005/0095095 A1 | 5/2005 | Hansl | |
| 2012/0039693 A1* | 2/2012 | Benedict | ................. E04H 6/225 414/231 |

(Continued)

FOREIGN PATENT DOCUMENTS

| | | |
|---|---|---|
| DE | 957200 C | 1/1957 |
| DE | 3641671 A1 | 6/1988 |

(Continued)

*Primary Examiner* — Kyle O Logan
(74) *Attorney, Agent, or Firm* — Laurence A. Greenberg; Werner H. Stemer; Ralph E. Locher

(57) ABSTRACT

A storage and retrieval device, in particular for parallel operation of a high-bay warehouse, contains a device frame, which has frame compartments arranged to form a three-dimensional compartment matrix, and has at least one cab used to hold storage goods. The electromotively driven cab can be moved within the compartment matrix in a vertical direction and/or in a second horizontal direction from each frame compartment. The storage and retrieval device advantageously realizes fast access because of the movability of the cab within a device frame of the storage and retrieval device in a vertical direction and/or in a second horizontal direction and realizes a high handling rate of storage goods in the operation of a high-bay warehouse because of the parallel operation of a plurality of cabs.

15 Claims, 19 Drawing Sheets

(30) Foreign Application Priority Data

Apr. 27, 2016 (DE) .......................... 10 2016 207 126
Sep. 22, 2016 (DE) .......................... 10 2016 117 941

(51) Int. Cl.

| | | |
|---|---|---|
| B66F 9/14 | (2006.01) | |
| B65G 1/04 | (2006.01) | |
| B66F 13/00 | (2006.01) | |
| F16H 7/02 | (2006.01) | |
| F16H 55/26 | (2006.01) | |
| F16H 57/038 | (2012.01) | |
| B65G 1/137 | (2006.01) | |

(52) U.S. Cl.

CPC ......... *B65G 1/0492* (2013.01); *B65G 1/1375* (2013.01); *B66F 9/072* (2013.01); *B66F 9/141* (2013.01); *B66F 13/00* (2013.01); *F16H 7/023* (2013.01); *F16H 55/26* (2013.01); *F16H 57/038* (2013.01)

(56) References Cited

U.S. PATENT DOCUMENTS

| | | | |
|---|---|---|---|
| 2015/0307276 A1* | 10/2015 | Hognaland | B65G 1/06 700/218 |
| 2016/0076914 A1 | 3/2016 | Gotz | |
| 2017/0024838 A1* | 1/2017 | Kropp | G06Q 50/28 |
| 2017/0226764 A1* | 8/2017 | Nussbaum | E04H 6/36 |
| 2018/0148259 A1* | 5/2018 | Gravelle | B65G 1/0464 |
| 2019/0375590 A1* | 12/2019 | Gravelle | B65G 1/0471 |

FOREIGN PATENT DOCUMENTS

| | | |
|---|---|---|
| DE | 19634216 A1 | 2/1998 |
| DE | 102013114275 A1 | 6/2014 |
| DE | 102016117941 A1 | 3/2018 |
| EP | 2995910 A1 | 3/2016 |
| JP | S5327971 A | 3/1978 |
| JP | 2013049515 A | 3/2013 |
| WO | 2004074602 A1 | 9/2004 |

\* cited by examiner

STORAGE AND RETRIEVAL DEVICE FOR PARALLEL OPERATION OF A HIGH-BAY WAREHOUSE AND OPERATING METHOD THEREFOR

BACKGROUND OF THE INVENTION

Field of the Invention

The invention relates to a storage and retrieval device, in particular for a parallel operation of a high-bay warehouse, and to an operating method therefor.

High-bay warehouses which have storage frames having end sides that are aligned along a first horizontal direction are widely used for the intermediate storage, for provisioning, and/or for picking specific goods. Each storage frame comprises a number of storage compartments which are disposed in the manner of a matrix in three spatial dimensions, thus in a three-dimensional manner, and in each case provide one storage space, for example for a stored goods item that is deposited on a Euro pallet, or for a container. The longitudinal sides of the individual storage frames are expediently directed toward one another and between neighboring storage frames can delimit a warehouse aisle that is aligned in a second horizontal direction. By way of such warehouse aisles it is possible for specific storage compartments to be accessed, for example by means of a stacker truck and/or a fork lift truck.

In order for the effort in terms of personnel to be reduced, automated conveyor vehicle lifting apparatuses which are positioned within a warehouse aisle are increasingly used instead of manually activated stacker trucks or fork lift trucks.

The conveyor vehicle lifting apparatuses known from the prior art usually have three degrees of freedom of movement, specifically a first degree of freedom of movement, by repositioning the conveyor vehicle along the warehouse aisle, conventionally referred to as the x-axis, a second degree of freedom of movement, by lifting and lowering a lifting apparatus, referred to as the y-axis, and finally a third degree of freedom of movement, composed of a movement in a horizontal direction that is perpendicular to the two other directions, in particular by way of a telescopic drive, the latter usually being referred to as the z-axis and which describes the movement when loading or unloading, respectively, the storage compartments. This conventional nomenclature will also be adhered to in the present text.

A conveyor vehicle lifting apparatus which has a vertical support that reaches across the entire height of the storage frame, said vertical support being repositionable along the storage frame in the second horizontal direction, for example, is known from publications DE 10 2013 114 275 A1 and US 2005/0095095 A1. A lifting table which is repositionable across the entire vertical direction of the vertical support is attached to the vertical support by means of a telescopic drive.

A telescopic drive known therefrom, or, for example, from DE 196 34 216 A1, comprises an electric motor which in most instances is attached to the vertical support and which drives rollers or a chain. Said rollers are operatively connected to the lifting table such that the latter can be moved perpendicularly to the warehouse aisle and perpendicularly to the vertical direction, thus in the first horizontal direction. Consequently, it is possible for substantially each storage compartment of the storage frame to be approached by means of the lifting table and for a stored goods item to be retrieved from the storage frame, or to be deposited therein, respectively, by means of a suitable apparatus of the lifting table.

In as far as a comparatively large number of storage compartments are to be provided by means of the high-bay warehouse, it is necessary for the storage frame and the vertical support of the conveyor vehicle lifting installation to have a comparatively large size, this requiring a comparatively large mass. Comparatively complex guiding of the heavy vertical support is required herein. In order for a comparatively rapid serving of the storage compartments to be enabled, a comparatively high dynamic of the vertical support and of the lifting table is required. A high performance drive is required to this end by virtue of the high mass of the vertical support. It is furthermore disadvantageous that the known conveyor vehicle lifting installation is capable of at all times approaching only one storage compartment, which is why the maximum number of stored goods that can enter or exit, respectively, the warehouse per unit of time is limited.

In order for this to be avoided, an accumulator installation for arbitrary goods, for example individual goods etc. of identical type, in particular for motor vehicles, has been proposed in DE 957 200 B, said accumulator installation being composed of at least one cell-containing portion, said portions being configured in the manner of a honeycomb or grid being disposed beside and on top of one another, said portion at least on one side on which the cells are accessible being assigned an installation that is composed of a plurality of conveyor baskets, or the like, each equipped with a dedicated drive for a plurality of travel directions, in particular for the vertical and the horizontal direction. The conveyor baskets herein are displaceable in a self-acting manner in a plurality of directions in such a manner that one conveyor basket on a detour in the conveying plane can drive around another conveyor basket, the introduction and extraction of the goods into or from, respectively, arbitrarily selectable cells thus being capable of being carried out on different incoming and outgoing conveyor tracks, each of the latter being selectable.

DE 36 41 671 A1 also discloses a warehouse system having a high-bay warehouse and conveyor installations having horizontal conveyor rails on each level, a storage and a retrieval installation, and optionally a control cab which can be coupled thereto and which is suspended on horizontal conveyor rails, wherein a section of the conveyor rail can be perpendicularly displaced by means of an elevator and fits into gaps of the conveyor rails on the individual levels.

Finally, an automatic warehouse system which is configured such that loads can be stored in a multiplicity of storage regions which are formed by vertically running supports and horizontally running beams is proposed in JP 2013-049515 A, wherein the loads can be loaded into and unloaded from a multiplicity of storage regions. The automated warehouse system comprises; vertical guide rails which are disposed on the supports; lateral guide rails which are disposed on the beams, and a moving truck. The truck has a frame body which has the same rectangular shape as at least one of the storage regions, and vertical frames and lateral frames on which guide rollers are either disposed on the vertical frame and engage with the vertical guide rails, or are disposed on the lateral frame and engage with the lateral guide rails.

The disposal of guide rails directly on the sides of the high-bay warehouses in the which conveyor baskets, or trucks, that bridge the warehouse aisle are to be guided does not sufficiently take into account that high-bay warehouses usually do not represent ideal rigid structures but, for example by virtue of temperature variations and/or mechanical influences, can tend to move, in particular fluctuate, this restricting the reliable guiding of such conveyor baskets or trucks, respectively. Such systems to date have therefore not been widely used in practice.

SUMMARY OF THE INVENTION

Proceeding therefrom, the present invention is based on the object of specifying a storage and retrieval device, in particular for a parallel operation of a high-bay warehouse, which is novel and improved as compared to the prior art, wherein in particular a rapid access and, on account of the preferred parallel operation, a high turnover of stored goods is to be enabled.

In terms of the storage and retrieval device, this object is achieved according to the invention by the features of the main device claim, and in terms of a respective operating method, by the features of the main method claim. Advantageous refinements and design embodiments which are in each case implementable individually or in mutual combination, are the subject matter of the respective dependent claims.

A storage and retrieval device according to the invention is first distinguished by a device frame which has frame compartments that are disposed so as to form a three-dimensional compartment matrix.

The storage and retrieval device according to the invention moreover is distinguished by at least one cab which serves for receiving a stored goods item and which, electromotively driven, within the three-dimensional compartment matrix is movable for repositioning from each frame compartment in a vertical direction and/or in a second horizontal direction. The storage and retrieval device according to the invention by way of the repositioning capability of at least one cab within a device frame of the storage and retrieval device in a vertical direction and/or in the second horizontal direction advantageously enables a rapid access and, on account of a parallel operation of a plurality of cabs, a high turnover of stored goods in the operation of a high-bay warehouse.

In a first preferred design embodiment the cab within the three-dimensional compartment matrix is movable for repositioning from each frame compartment in a vertical direction and from at least one row of frame compartments that in a second horizontal direction are disposed beside one another in a second horizontal direction. On account of the reduction in the number of frame compartments from which the cab is movable for repositioning in two directions, specifically in a vertical direction and in a second horizontal direction, in particular first electromotive drives can be advantageously saved while maintaining an almost identically rapid reachability of the individual frame compartments by the cab and thus an almost identical flexibility in the operation of the storage and retrieval device.

A "grid layout" of this type, that is to say the sequence of rows of frame compartments from which the cab is repositionable either only in a vertical direction or in two directions, specifically in the vertical direction and in a second horizontal direction, can be advantageously varied, in particular depending on customer requirements, wherein the lowermost row of frame compartments is particularly preferably at all times one of the rows of frame compartments from which the cab is repositionable in a vertical direction and in a second horizontal direction. It is moreover advantageous for at least one loading compartment for loading and/unloading to be disposed in this row of frame compartments.

In a further design embodiment of the present invention it is preferable that one of the device frame and the cab has at least one, preferably at least two, in particular actively configured, horizontal drive tracks that run in the second horizontal direction, and at least one, preferably at least two, in particular actively configured, vertical drive tracks that run in the vertical direction, and the respective other has a corresponding number of, in particular passively configured, horizontal drive tracks that run in the second horizontal direction, and a likewise corresponding number of passively configured, vertical drive tracks that run in the vertical direction, or vice versa.

Drive tracks that according to the invention are preferably actively configured, preferably each portion of the actively configured drive tracks that is delimited by a frame compartment, herein comprise at least one electromotively driven timing belt, and passively configured drive tracks, preferably each portion of the passively configured drive tracks that is configured on a cab, comprise at least one rack for interacting with at least one of the timing belts. The mutually corresponding disposal of active and passive drive tracks on the device frame and on the cab can advantageously enable a transmission of force from the actively configured drive tracks. In particular the interaction between the electromotively driven timing belts of actively configured drive tracks and the racks of passively configured drive tracks can advantageously lead to a repositioning movement of the cab in the device frame. The variant in which the cab has at least one, preferably at least two, in particular actively configured, horizontal drive tracks that run in the second horizontal direction, and at least one, preferably at least two, in particular actively configured, vertical drive tracks that run in the vertical direction moreover offers the advantage that electromotive drives can be saved in comparison to the other variant in which the device frame has actively configured drive tracks. In particular when changing between the individual frame compartments, when the cab temporarily in part departs from the mechanical guiding by the guide tracks, two horizontal and/or vertical drive tracks that in each case are disposed so as to be mutually parallel on the device frame can moreover guarantee a better support and thus a more reliable repositioning movement of the cab.

Each actively configured horizontal drive track, preferably each portion of the actively configured drive tracks that is delimited by a frame compartment, for moving the cab for repositioning in the second horizontal direction can expediently be operatively connected directly or indirectly to at least one first electromotive drive, and each actively configured vertical drive track, preferably each portion of the actively configured drive tracks that is delimited by a frame compartment, for moving the cab for repositioning in the vertical direction can expediently be operatively connected directly or indirectly to at least one second electromotive drive, wherein each electromotive drive can in particular preferably be a servo drive. The electromotive drives that are operatively connected directly or indirectly to the actively configured horizontal and/or vertical drive tracks advantageously provide a kinetic energy for driving the repositioning movement of the cab. It is particularly advantageous herein for the electromotive drives to be servo drives since this advantageously facilitates the control capability of the repositioning movement of the cab.

In a further design embodiment of the present invention it is preferable that each electromotive drive comprises an externally cogged and preferably also internally cogged timing belt that is tensioned in the respective drive direction; wherein in a repositioning movement of the cab in the second horizontal direction the first rack of a passively configured, horizontal drive track engages with at least one first timing belt of one of the actively configured, horizontal drive tracks, and second timing belts of actively configured, vertical drive tracks in relation to the second rack are aligned so as to permit a horizontal transverse displacement; and wherein in a repositioning movement of the cab in the vertical direction the second rack of a passively configured drive track engages with at least one second timing belt of one of the actively configured, vertical drive tracks, and first timing belts of actively configured, horizontal drive tracks in relation to the first rack are aligned so as to permit a vertical transverse displacement. The electromotive drives by means of externally cogged and preferably also internally cogged timing belts can advantageously transmit at a low loss the kinetic energy that for driving the repositioning movement of the cab is provided by said drives to the racks of the cab and thus to the cab per se. Double-cogged timing belts, that is to say externally cogged and internally cogged timing belts, when interacting with gear wheels that for the transmission of force are disposed on the motors on the electromotive drives herein advantageously guarantee a particularly positive operative connection between the respective electromotive drive and the respective timing belt, and on account thereof guarantee a slippage-free and thus low-loss transmission of force.

In a further preferred design embodiment the device frame has a first number of horizontal guide tracks that run in the second horizontal direction, and a second number of vertical guide tracks that run in the vertical direction, wherein the horizontal guide tracks in the vertical direction are disposed so as to be equidistant on top of one another and/or in a first horizontal direction that is perpendicular to the second horizontal direction are disposed so as to be mutually spaced apart; wherein the vertical guide tracks in the second horizontal direction are disposed so as to be equidistant beside one another and/or in a first horizontal direction that is perpendicular to the second horizontal direction are disposed so as to be mutually spaced apart; and wherein the frame compartments of the device frame are preferably at least in part formed by means of the horizontal and vertical guide tracks. The number of the frame compartments of the device frame that are at least in part formed by the horizontal and vertical guide tracks can advantageously be adapted to a number of storage compartments of a storage frame of the high-bay warehouse by adding and/or subtracting horizontal or vertical guide tracks, respectively. The cab during the repositioning movement can be advantageously guided by means of the guide tracks and, on account thereof, can be moved to as to be repositioned in a stable manner even at high speeds and/or rapid directional changes.

In a further design embodiment of the present invention it is preferable for the cab and to comprise a first guide rod that runs in the second horizontal direction, and a second guide rod that runs in the vertical direction; wherein in a repositioning movement of the cab in the second horizontal direction the first guide rod is operatively connected to one of the first horizontal guide tracks, and wherein in a repositioning movement of the cab in the vertical direction the second guide rod is operatively connected to one of the first vertical guide tracks. The operative connection between the guide rods of the cab and the guide tracks of the device frame can advantageously avoid any tipping of the cab within the device frame. To this end, the two guide rods can be designed, for example, in the manner of runners which slide along the respective guide tracks. The guide tracks herein are expediently designed in the manner of an L-support, and the guide rods bear in a form-fitting manner on the respective guide track, for example.

In a further design embodiment of the present invention it is preferable for the device frame to have a number of horizontal drive tracks that run in the second horizontal direction and in the vertical direction are disposed so as to be equidistant on top of one another and in each case so as to be between neighboring first horizontal guide tracks, and a number of vertical drive tracks that run in the vertical direction and in the second horizontal direction are disposed so as to be equidistant beside one another and in each case so as to be between neighboring first vertical guide tracks. The drive tracks that are disposed, preferably in a regular pattern, in the device frame can advantageously enable a transmission of force and thus a repositioning movement of the cab within the device frame. The number of the horizontal drive tracks herein is expediently identical to the number of the first horizontal guide tracks and/or the number of the vertical drive tracks is expediently identical to the number of first vertical guide tracks.

Each electromotive drive herein can expediently comprise a linear motor, wherein passively configured drive tracks of the cab can have the passive secondary part of the respective linear motor, and actively configured drive tracks of the frame compartments can have the active primary part; or wherein actively configured drive tracks of the cab can have the active primary part of the respective linear motor, and passively configured drive tracks can have the passive secondary part. As an alternative to server motors, the use of linear motors can advantageously enable higher accelerations of the cab and/or higher speeds of the repositioning movement of the cab within the device frame.

According to the invention, the cab preferably comprises a gripper and/or a telescopic drive for transferring a stored goods item. A gripper and/or a telescopic drive can advantageously enable a rapid and reliable loading and unloading of the individual storage compartments. Dissimilar grippers, telescopic drives, and/or dissimilar cabs can be used herein, depending on the properties of the stored goods item that is to be stored in the high-bay warehouse. It is moreover advantageous for a transfer of the stored goods item to be possible in the first horizontal direction to either side of the cab by means of the gripper. In this way, a stored goods item can advantageously be transferred from one storage frame to a neighboring storage frame by means of the gripper. Also, two storage frames can be served by means of the cab, in as far as the device frame is located in a warehouse aisle that is formed between two storage frames.

Alternatively or additionally thereto, the cab can also comprise a telescopic drive, the stored goods item, in particular a container, being picked up by means of the table of said telescopic drive. The table advantageously sits below the floor of the container, in particular between two potential runners of the container. In order for the container to be picked up, the table is positioned between the two runners of the container. In order for the container to be lifted prior to the latter being retrieved from a storage compartment, or in order for said container to be deposited, respectively, the table is advantageously moved for repositioning in the vertical direction, to which end the cab is expediently moved so as to be repositioned in the vertical direction.

In a further alternative or additional design embodiment of the invention the floor of the container and/or the runners of the latter can be fitted onto preferably L-shaped rails that at least in part run in the first horizontal direction within the storage compartment. In order for the container to be received, the table in this design embodiment is positioned between the rails of the storage compartment. In order for the container to be raised prior to the latter being retrieved from a storage compartment, or in order for said container to be deposited, the table is advantageously moved for repositioning in the vertical direction, to which end the cab is expediently moved for repositioning in the vertical direction.

A design embodiment in which the cab for the repositioning movement within the guide tracks comprises at least one mobility means, preferably eight guide wheels which are disposed on the corners of the cab and have rotation axes that point in the first horizontal direction, has furthermore proven successful; wherein the guide tracks are preferably configured as linear guide rails which have a profile that matches the mobility means, preferably formed by guide wheels. Mobility means, in particular eight guide wheels which are disposed on the corners of the cab, can advantageously facilitate the repositioning movements of the cabs within the device frame. In particular in the case of a comparatively heavy load in the cab, a resistance to rolling can be easier to overcome than a resistance to sliding, on account of which a lower motor output is required for moving the cab for repositioning, and energy can be advantageously saved. The use of guide wheels which have a profile that matches the guide tracks advantageously reduces sliding movements in particular along the first horizontal direction and thus guarantees a more stable travelling movement of the cab in the second horizontal direction, or in the vertical direction, respectively.

According to the invention it can finally be provided that at least one, preferably each, frame compartment of the device frame comprises a measuring system for measuring an absolute value of the repositioning movement of the cab, wherein the measuring system can be configured as an incremental transducer and a means for position determination, and/or as an absolute position measurement system. The disposal of a measuring system comprising an incremental transducer and a means for position determination of the repositioning movement of the cab in at least one, preferably in each, frame compartment advantageously enables the exact determination of the position of the cab within the device frame. The electromotive drives such as, in particular server motors of the drive tracks, can then be synchronized by virtue of the position data collected. Positional deviations such as arise, for example, by slippage and/or dimensional tolerances, can be mathematically corrected by comparing an actual position with a nominal position, preferably in each frame compartment approached.

Alternatively or additionally thereto, an absolute position measurement system such as is described, for example, in EP 2 995 910 A1 of the applicant, can be provided in a more inexpensive alternative.

The present invention also relates to a method for operating a storage and retrieval device as has been described above, having a device frame which has frame compartments that are disposed so as to form a three-dimensional compartment matrix, and having at least one cab which serves for receiving a stored goods item and which, electromotively driven, within the three-dimensional compartment matrix is moved for repositioning from each frame compartment in a vertical direction and/or in a second horizontal direction. The method according to the invention for operating a storage and retrieval device, by way of the repositioning capability of at least one cab within a device frame of the storage and retrieval device in a vertical direction and/or in a second horizontal direction, advantageously enables a rapid access and, on account of a parallel operation of a plurality of cabs, a high turnover of stored goods in the operation of a high-bay warehouse.

In design embodiments of the method according to the invention it is preferable that, for moving a cab for repositioning within a device frame:

in a method step position values of the timing belts of mutually neighboring frame compartments and a position of the cab within the frame compartment in which the cab is currently located are determined; and/or in a method step the position value of the timing belt as well as the position of the cab within the frame compartment in which the cab is currently located are defined as the relative zero point; and/or in a method step the position value of the timing belt of the frame compartment that follows in the direction of the repositioning movement of the cab is synchronized with the position value of the timing belt of the frame compartment in which the cab is currently located; and/or in a method step the cab by a movement of the timing belt is displaced by a spacing in the direction of the repositioning movement of the cab, wherein the spacing is in particular the spacing between the centers of two frame compartments that are neighboring in the direction of the repositioning movement of the cab; and/or in a method step, upon a transfer of the cab into the frame compartment that within the device frame follows in the direction of the repositioning movement of the cab having been performed, the position value of the timing belt in the frame compartment in which the cab is located upon having been transferred, is defined as the new relative zero point.

In a displacement transverse to the cogging direction, the cogging of the rack and the timing belt when pushed together, that is to say in the transfer of the cab from one frame compartment to a following, has to be synchronized. The cogging position of the rack is established by the repositioning movement of the cab within the guide tracks. The method steps now advantageously enable, complete or partial setting of the cogging of the timing belts to the cogging position of the racks of the cab during the repositioning movement. Positional errors can advantageously be mathematically corrected in particular by defining relative zero points of the position of the cab and the actual cogging position of the timing belts when passing one, preferably when passing each, frame compartment.

The present invention for the first time provides a storage and retrieval device which by way of the repositioning capability of at least one cab within a device frame of the storage and retrieval device in a vertical direction and/or in a second horizontal direction advantageously implements a rapid access and, on account of a parallel operation of a plurality of cabs, a high turnover of stored goods in the operation of a high-bay warehouse.

BRIEF DESCRIPTION OF THE SEVERAL VIEWS OF THE DRAWING

Further advantages and design embodiments will be explained hereunder by means of preferred exemplary embodiments of the invention and in conjunction with the drawing in which, in a schematic manner.

DESCRIPTION OF THE INVENTION

The same reference signs identify identical or equivalent components in the description hereunder of preferred embodiments of the present invention.

Figure 1:
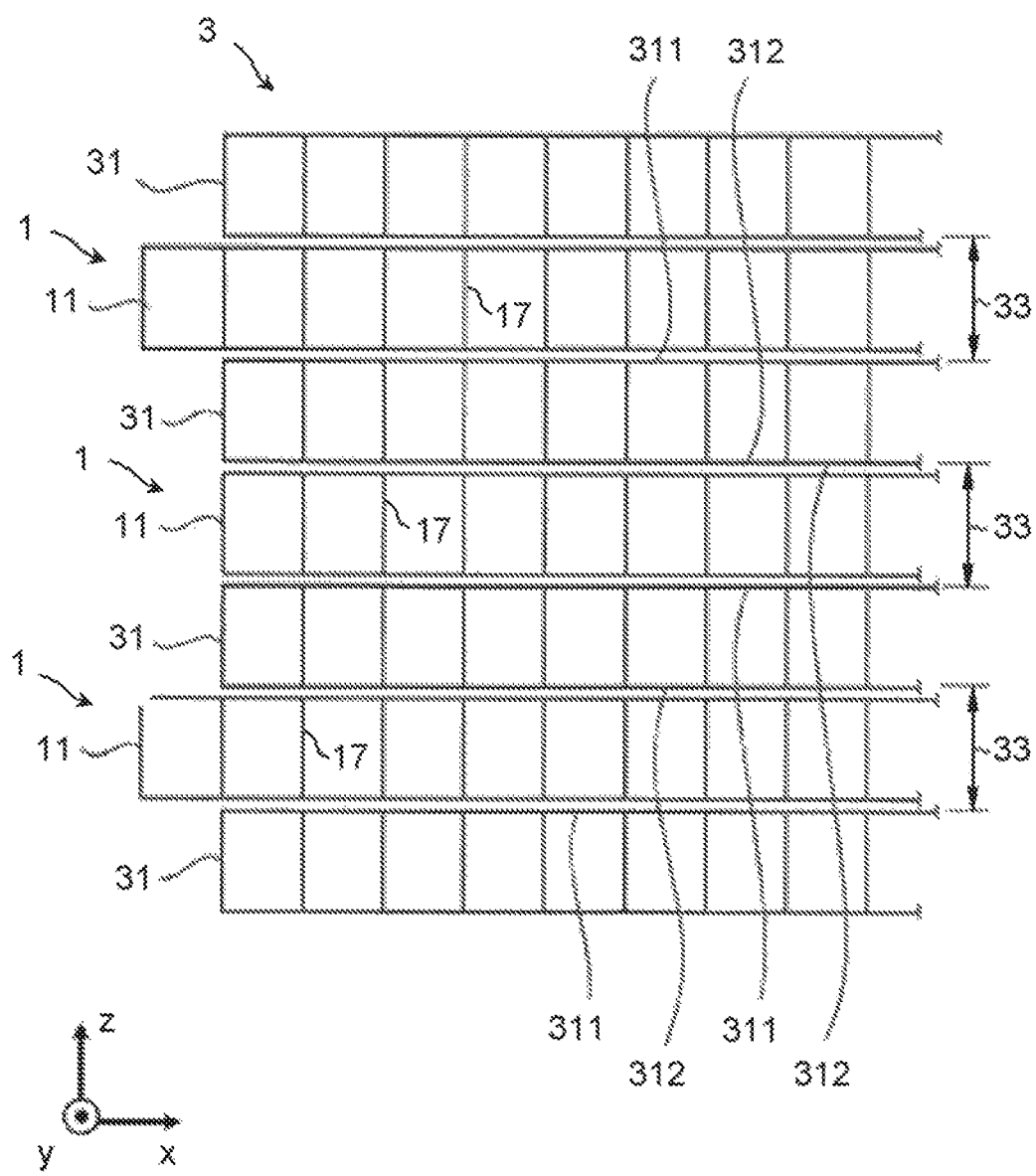
FIG. 1 in a plan view shows a high-bay warehouse having storage frames, and having storage and retrieval devices which have device frames, wherein the high-bay warehouse in an alternating manner always has a storage frame and a warehouse aisle having a storage and retrieval device disposed therein.

FIG. 1 in fragments and in a plan view shows a high-bay warehouse 3, having storage frames 31, and having a storage and retrieval device 1 having in each case one device frame 11, wherein the high-bay warehouse 3 in an alternating manner always has one storage frame 31 and one warehouse aisle 33 having a storage and retrieval device 1 disposed therein. In an exemplary manner, four storage frames 31 which by way of the end sides 313 thereof are set up in a row along a first horizontal direction Z and run in a second horizontal direction X that is perpendicular to the first horizontal direction Z, are shown. In each case one warehouse aisle 33 is formed in the second horizontal direction X between neighboring storage frames 31, in each case one storage and retrieval device 1 being disposed within one warehouse aisle 33. Each of the storage frames 31 has a first side 311 and a second side 312, each of the latter forming the longitudinal delimitation of the storage frame 31 along a second horizontal direction X.

Each storage frame 31 in the example illustrated here can be directly loaded or unloaded, respectively, by means of the storage and retrieval device 1, by way of the first side 311 as well as by way of the second side 312, each being designed so as to be open in the first horizontal direction Z.

Figure 2A:
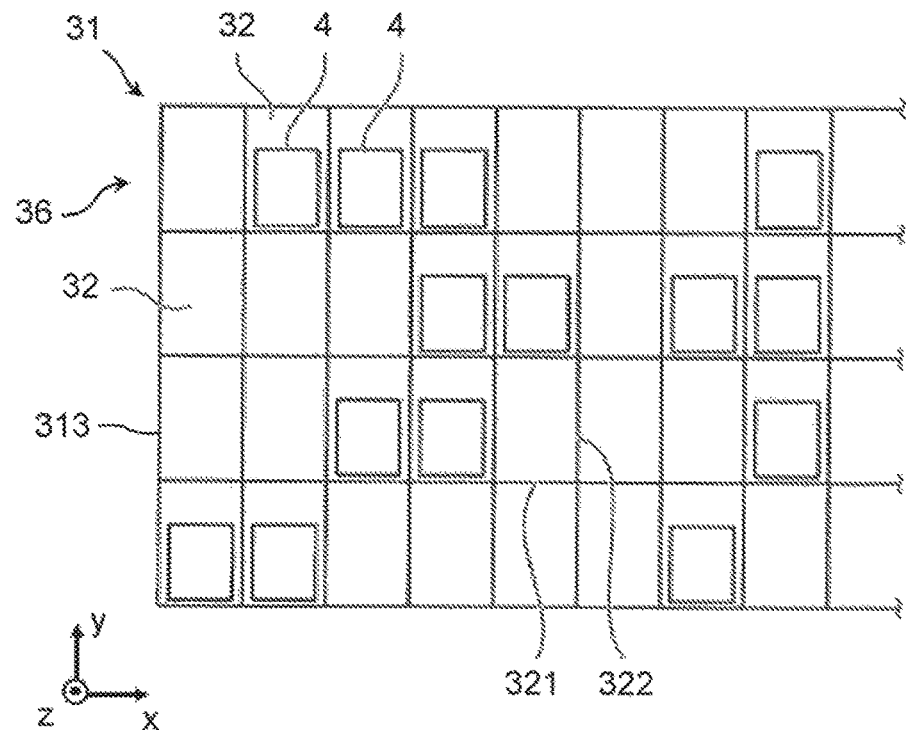
FIG. 2a in a side view shows one of the storage frames having a stored goods item received therein.
Figure 2B:
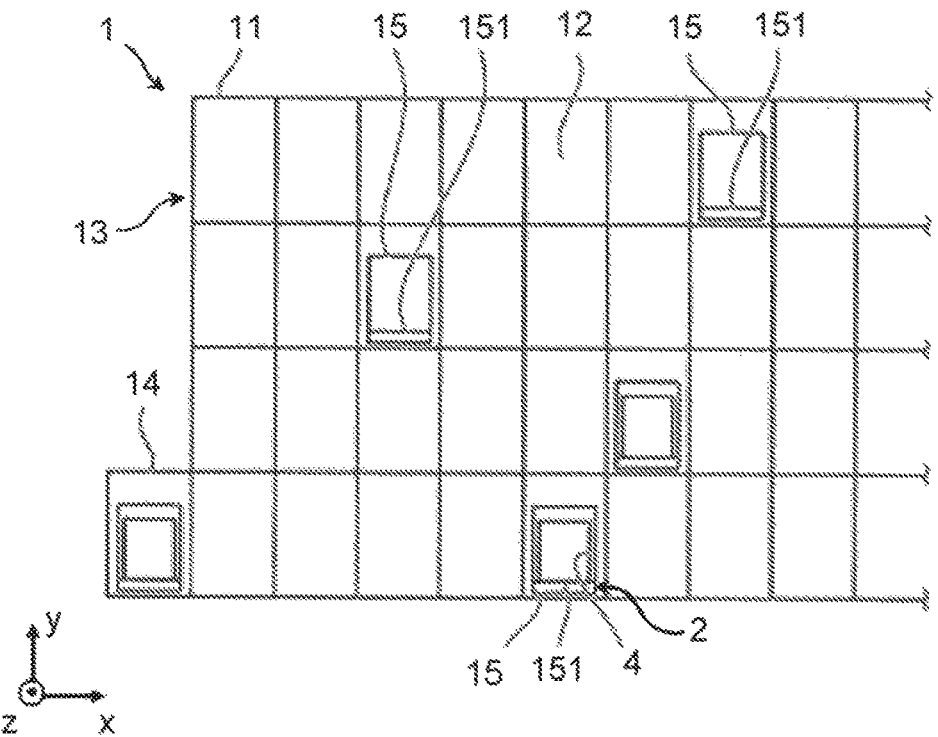
FIG. 2b in a side view shows a first design embodiment of one of the device frames and of cabs that are guided so as to be movable for repositioning therein.

FIG. 2a and FIG. 2b, in each case in a side view, show one of the storage frames 31 having a stored goods item 4 received therein (FIG. 2a), and one of the device frames 11 and cabs 15 guided therein (FIG. 2b), respectively. The storage frame 31 has storage compartments 32 that are disposed so as to form a three-dimensional compartment matrix 36, said storage compartments 32 along a second horizontal direction X and a vertical direction Y being disposed beside one another so as to form a three-dimensional compartment matrix 36 of the storage frame 31. The storage compartments 21 are preferably of identical design, and formed, for example, by means of stays 322 that run in the first horizontal direction Z and the second horizontal direction X and in the vertical direction Y. A stored goods item 4 is positioned, or positionable, respectively, within some of the storage compartments 32 (FIG. 2a), for example by means of the device frame 11 of a storage and retrieval device 1. The stored goods item 4 is in each case in particular a container 41 which in particular has the container runners 412 that run in the first horizontal direction Z (cf. FIG. 18a). Such a device frame 11, illustrated in FIG. 2b, accordingly has a number of frame compartments 12 which are in each case disposed in three spatial dimensions, preferably so as to be cuboid and of identical design, along the second horizontal direction X and the vertical direction Y, forming a three-dimensional compartment matrix 13 of the storage and retrieval device 1.

A loading compartment 14 (cf. also FIG. 3) which is preferably constructed in a manner identical to that of the frame compartments 12 can moreover be attached to the three-dimensional compartment matrix 13 of the device frame 11, a stored goods item 4 being able to be supplied to and/or discharged from the storage and retrieval device 1 by way of said loading compartment 14.

A cab 15 (FIG. 3, FIG. 12) which when required contains a stored goods item 4 is positioned or positionable, respectively, within the frame compartments 12, or the loading compartment 14, respectively. The cab 15 per se is in particular electromotively driven, wherein each cab 15 has two racks 154, 155, for example, of which one rack 154 runs in the horizontal direction X, and the remaining rack 155 runs in the vertical direction Y. A plurality of electromotively movable cabs 15, having a cab floor 151, which are repositionable along the second horizontal direction X and the vertical direction Y are preferably disposed in the device frame 11.

To this end, each of the frame compartments 12 preferably has two electromotively driven timing belts 1132, 1142 (illustrated in FIG. 9), of which one timing belt 1132 likewise runs in the second horizontal direction X and the other timing belt 1142 runs in the vertical direction Y. In as far as one of the racks 154 or 155 of the cab 15 engages with the respective timing belt 1132 or 1142, and said timing belt 1132 or 1142 is driven, the cab 15 is consequently moved for repositioning in the respective direction X or Y to the next frame compartment 12 and to the timing belt 1132, 1142 of the latter. Each cab 15, electromotively driven, within the three-dimensional compartment matrix 13 is thus movable for repositioning from each frame compartment 12 in the second horizontal direction X and in the vertical direction Y. The storage and retrieval device 1 expediently has a number of cabs 15 of identical type which can be moved for repositioning in a mutually independent manner.

In an alternative design embodiment of the invention (not illustrated) racks that run in the second horizontal direction X along the horizontal drive tracks 113 and/or racks that run in the vertical direction Y along the vertical drive tracks 114 can be disposed on the frame compartments 12. The cab 15 in a design embodiment of this type then advantageously comprises the electromotive drives 1131, 1141, wherein the respective timing belt 1132 that runs in the second horizontal direction X for the repositioning movement of the cab 15 can engage with the rack of the device frame 11 that runs along the horizontal drive track 113, and/or the respective timing belt 1142 that runs in the vertical direction Y for the repositioning movement of the cab 15 can engage with the rack of the device frame 11 that runs along the vertical drive track 114.

Figure 3:
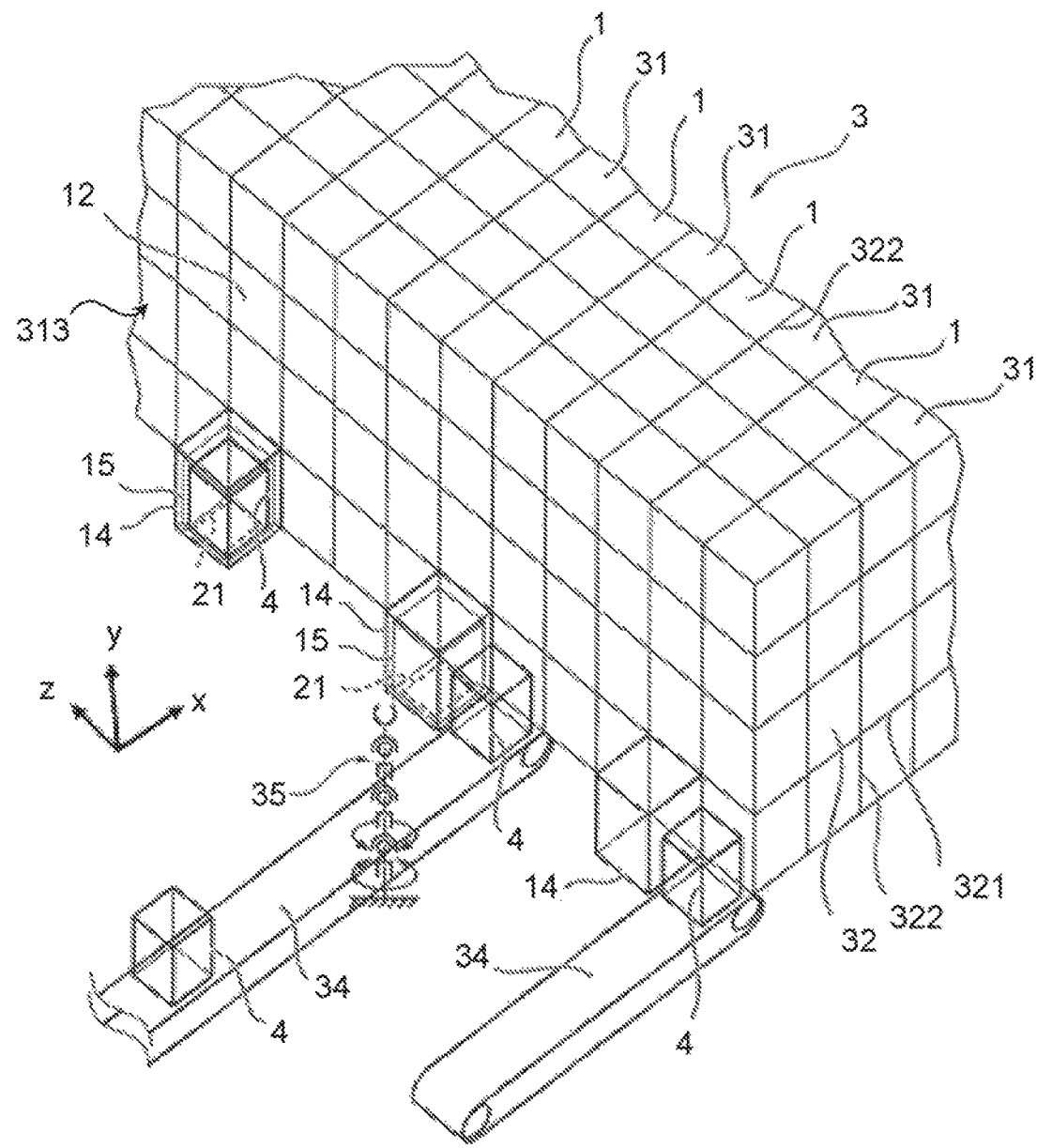
FIG. 3 in a simplified perspective fragment shows storage frames, storage and retrieval devices, loading compartments, a conveyor belt, and a robot, of a high-bay warehouse in a manner analogous to that of FIG. 1.

FIG. 3 in a simplified perspective fragment shows storage frames 31 and a storage and retrieval device 1 of a high-bay warehouse 3 analogous to that of FIG. 1, wherein the high-bay warehouse 3 in this variant (FIG. 3) in an alternating manner always has one storage frame 31 and one storage and retrieval device 1 that is disposed in a warehouse aisle 33. The storage frame 31 has the individual storage compartments 32, the edges thereof being formed by means of the stays 322 which are mutually disposed at right angles. A storage and retrieval device 1 is disposed so as to neighbor at least one side 311 or 312 of each storage frame 31. The storage and retrieval device 1 is formed by the device frame 11 which comprises a number of frame compartments 12. The frame compartments 12 are in each case designed so as to be cuboid and of identical type. Moreover, the frame compartments 12 are disposed so as to form a three-dimensional compartment matrix 13 which in the example shown comprises a plurality of lines (planes) and a plurality of columns. The device frame 11 in the assembled state is attached to at least one side 311 and/or 312 of each storage frame 31, and is fastened to the latter, or vice versa.

The number and the arrangement of the frame compartments 11 corresponds to the number, or the arrangement, respectively, of the storage compartments 32. In other words, the storage frame 31 likewise has the plurality of columns and a plurality of lines and planes. The size of the storage compartments 32 in the first horizontal direction X and the vertical direction Y also corresponds substantially to the size of the frame compartments 12, such that each of the storage compartments 32 of the storage frame 31 is assigned one of the frame compartments 12 which in the first horizontal direction Z substantially adjoins the respective storage compartment 32 and is aligned with the latter, for example.

In one embodiment of the invention, each of the cabs 15 comprises a gripper (not illustrated) which is located either on the floor, on a side wall, or the ceiling of the respective cab 15. The stored goods item 4 located in the respective cab 15 is conveyed into the assigned storage compartment 32 by means of the gripper, or is conveyed from said storage compartment 32 to the cab 15.

In one further embodiment of the invention, each of the cabs 15 comprises a telescopic drive 2 (only schematically illustrated) which is located on the cab floor 151 of the respective cab 15. Stored goods item 4 located in the respective cab 15 can be moved into the assigned storage compartment 32 by means of the telescopic drive 2, or can be retrieved from said storage compartment 32 and moved to the cab 15.

It is furthermore illustrated in FIG. 3 how a loading compartment 14 which enables the supply, or the discharge, of a stored goods item 4 into or out of the storage and retrieval device 1, respectively, can be disposed on at least one storage and retrieval device 1 on an end side 313 of the high-bay warehouse 3. To this end, the high-bay warehouse 3 comprises, for example, conveyor belts 34 which run in the first horizontal direction Z or the second horizontal direction X and which are in each case assigned to one of the loading compartments 14. Each of the conveyor belts 34 herein is disposed beside in each case one of the loading compartments 14 so as to be a direct neighbor to the latter in the first horizontal direction Z. Each of the loading compartments 14 herein serves for loading and unloading a cab 15 of the respective storage and retrieval device 1. As far as the cab 15 is located within the loading compartment 14, the stored goods items 4 herein is conveyed from the conveyor belt 34 into the cab 15, or conveyed from the latter to the respective conveyor belt 34. The unloading and loading of the stored goods item 4 is preferably performed in an automated manner, for example by means of a robot 35, which is, for example, a 6-axis articulated robotic arm having a gripper hand, as is illustrated here.

Figure 4:
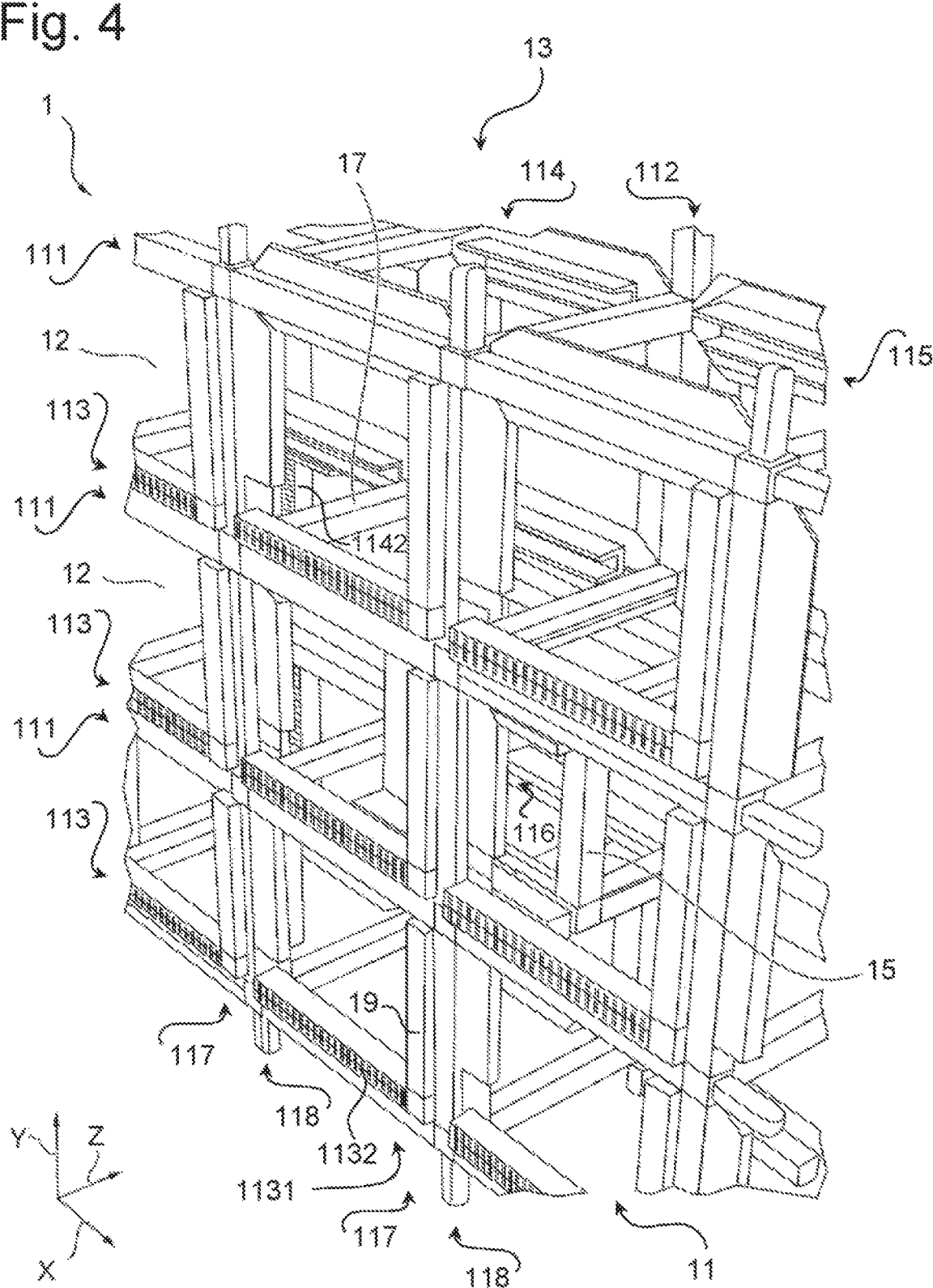
FIGS. 4, 5 in a perspective view show in each case a fragment of a first variant of the first design embodiment of the device frame of a storage and retrieval device having frame compartments that are disposed so as to form a three-dimensional compartment matrix and a cab of the storage and retrieval device from FIG. 3, said cab being disposed so as to be movable for repositioning within said compartment matrix by means of a horizontal and a vertical drive track.
Figure 5:
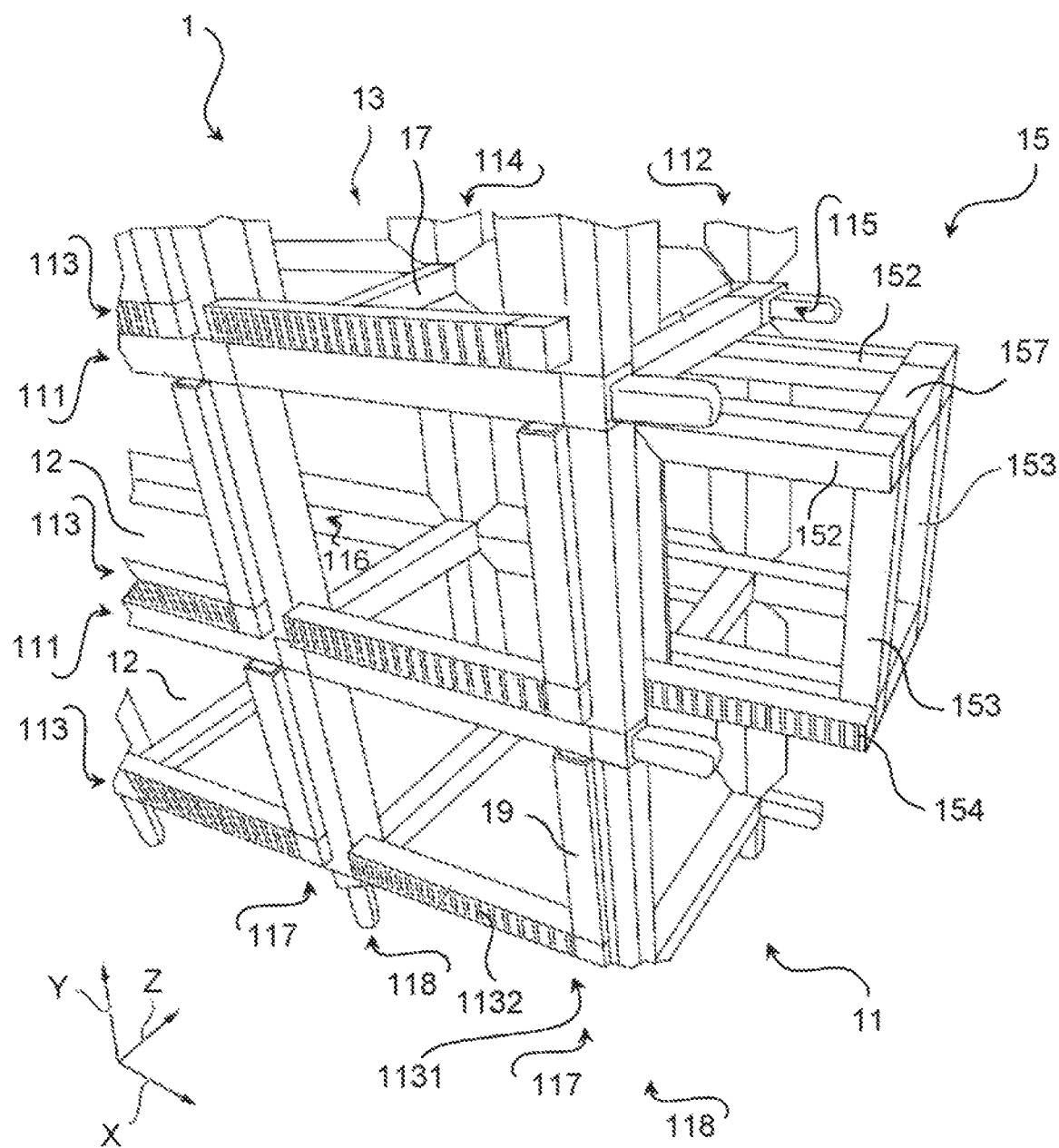

FIGS. 4 and 5 in a perspective view show in each case a fragment of a first variant of the first design embodiment of the device frame 11 of a storage and retrieval device 1 having frame compartments 12 that are disposed so as to form a three-dimensional compartment matrix 13, and a cab 15 of the storage and retrieval device 1 from FIG. 3, said cab 15 being disposed in said compartment matrix 13 so as to be movable for repositioning therein by means of a horizontal drive track 113 and of a vertical drive track 114, said storage and retrieval device 1 likewise extending substantially in the second horizontal direction X and in the vertical direction Y. The storage and retrieval device 1 has the cab 15 which, electromotively driven in a decentralized manner, within the three-dimensional compartment matrix 13 is repositionable in the second horizontal direction X and in the vertical direction Y. To this end, the cab 15 can be repositioned from each of the frame compartments 12 both in the second horizontal direction X and the vertical direction Y. In other words, the respective frame compartment or compartments 12, respectively, that is/are neighboring in the second horizontal direction X, and the frame compartment or compartments 12, respectively, that is/are neighboring in the vertical direction Y can be reached directly from each frame compartment 12 by means of the cab 15. The movement in the second horizontal direction X and the movement in the vertical direction Y herein are in each case performed sequentially. In other words, the cab 15 in this exemplary embodiment, electromotively driven, is repositionable from each of the frame compartments 12 to a neighboring frame compartment 12, wherein a directional change is enabled only once the respective neighboring frame compartment 12 has been reached, and wherein the movement is either in the second horizontal direction X or the vertical direction Y, but can arbitrarily selected therefrom.

The cab 15 serves for receiving the stored goods item 4. When in operation, one of the frame compartments 12 is actuated by means of the cab 15, said frame compartment 12 being assigned to one of the storage compartments 32. The stored goods item 4 is retrieved from the respective storage compartment 32 by means of a gripper (not illustrated) or of a telescopic drive 2 of the cab 15 (cf. FIG. 12) and is displaced into the cab 15 that is located in the assigned frame compartment 12. Subsequently there to, a further frame compartment 12 is actuated by means of the cab 15, and the stored goods item 4 by means of the gripper or the telescopic drive 2 of the cab 15 is moved into the storage compartment 32 that is assigned to the further frame compartment 12.

Alternatively, a storage compartment 14 or a comparable unloading position of the device frame 12 is actuated by way of the cab 15, and the stored goods item 4 is retrieved from the storage and retrieval device 1. For example, at this position the stored goods item 4 is introduced into the cab 15, and the latter within the three-dimensional compartment matrix 13 is subsequently conveyed to a requested frame compartment 12. There, the stored goods item 4 is conveyed into the associated storage compartment 32.

The storage and retrieval device 1 can in particular have a number of cabs 15 of this type, which within the same device frame 12 are independently repositionable, this on account of the parallel operation implemented thereby advantageously reducing the turnover time. The cabs 15 can thus independently reach each of the storage compartments 32, wherein a plurality of cabs 15 can be repositioned in a mutually independent manner and simultaneously (thus in a temporally parallel manner). Each cab 15 repositions either in the second horizontal direction, X-direction, or in the vertical direction, Y-direction, and can by way of a directional change "run around corners", figuratively speaking.

Figure 6:
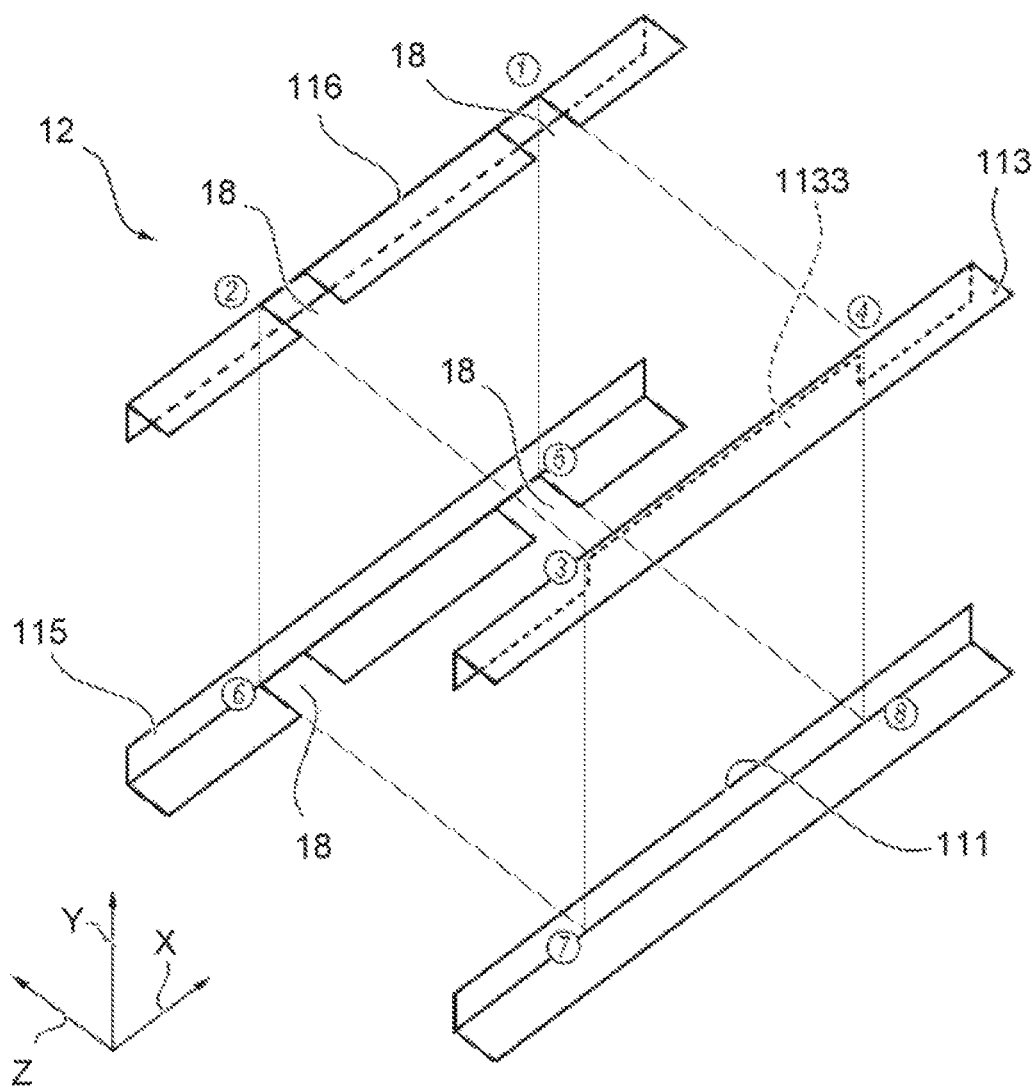
FIG. 6 in a perspective view shows a fragment of one of the frame compartments of a second variant of the first design embodiment of the device frame of a storage and retrieval device, said variant focusing on the at least one horizontal drive track and three horizontal guide tracks required for a horizontal repositioning movement of a cab.
Figure 7:
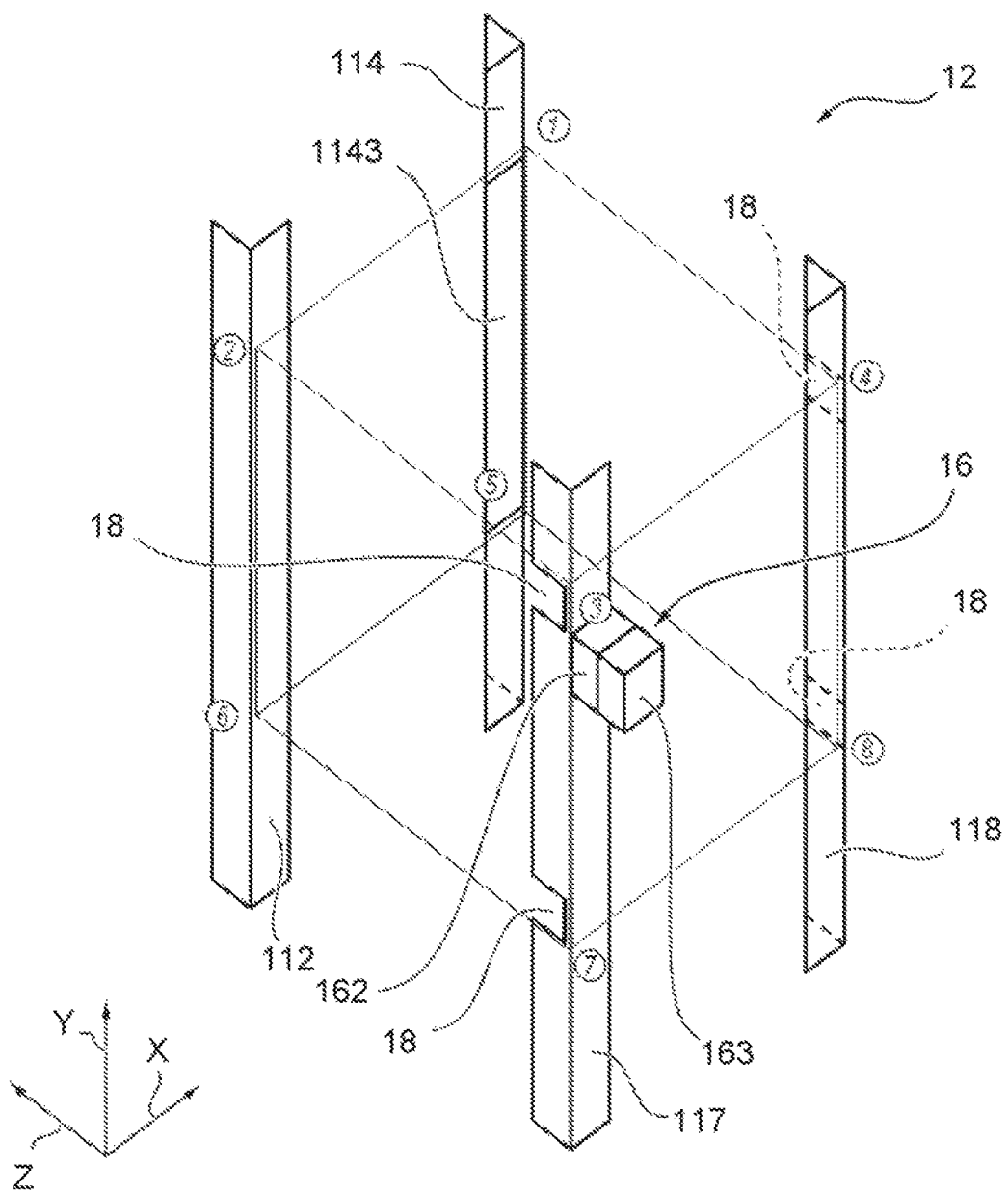
FIG. 7 in a perspective view shows a fragment of one of the frame compartments of a second variant of the first design embodiment of the device frame of a storage and retrieval device, said variant focusing on the at least one vertical drive track and three vertical guide tracks required for a vertical repositioning movement of a cab.
Figure 8:
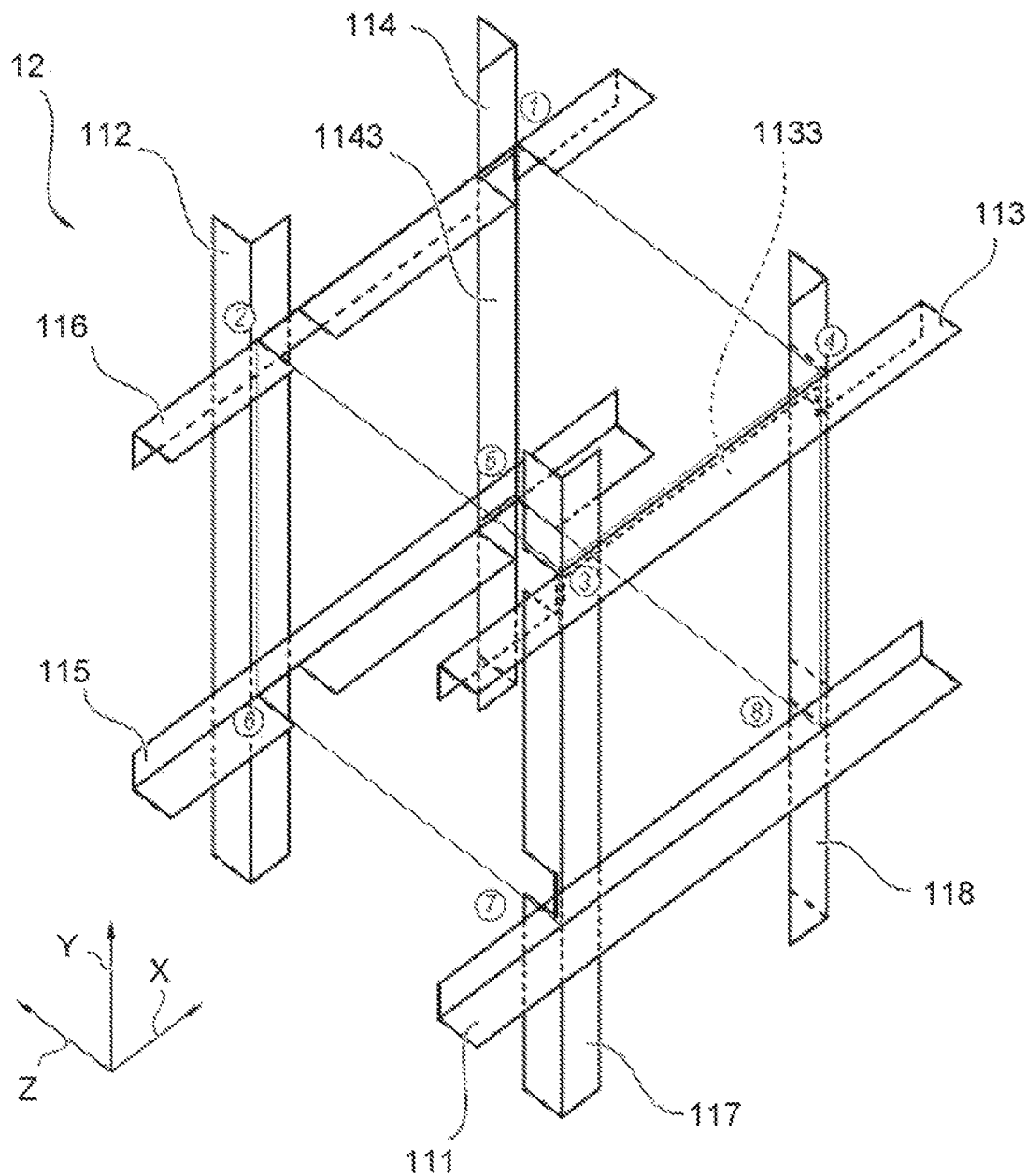
FIG. 8 in a perspective view shows one of the frame compartments of a second variant of the first design embodiment of the device frame of a storage and retrieval device, said second variant combining the drive and guide tracks from FIGS. 6 and 7.

FIG. 6 in a perspective view shows a fragment of one of the frame compartments 12 of a second variant of the first design embodiment of the device frame 11 of a storage and retrieval device 1, said variant focusing on the at least one horizontal drive track 113 and three horizontal guide tracks 111, 115, 116 required for a horizontal repositioning movement of a cab 15. FIG. 7 in a perspective view shows a fragment of one of the frame compartments 12 of a second variant of the first design embodiment of the device frame 11 of a storage and retrieval device 1, said variant focusing on the at least one vertical drive track 114 and three vertical guide tracks 112, 117, 118 required for a vertical repositioning movement of a cab 15. FIG. 8 in a perspective view shows one of the frame compartments 12 of a second variant of the first design embodiment of the device frame of a storage and retrieval device, said second variant combining the drive tracks 113, 114 and the guide tracks 111, 112, 115, 116, 117, 118 from FIGS. 6 and 7. As compared to the first variant (FIGS. 4 and 5), the second variant described hereunder differs in the choice of the disposal of the drive tracks 113 and 114 within the three-dimensional compartment matrix 13.

Figure 12:
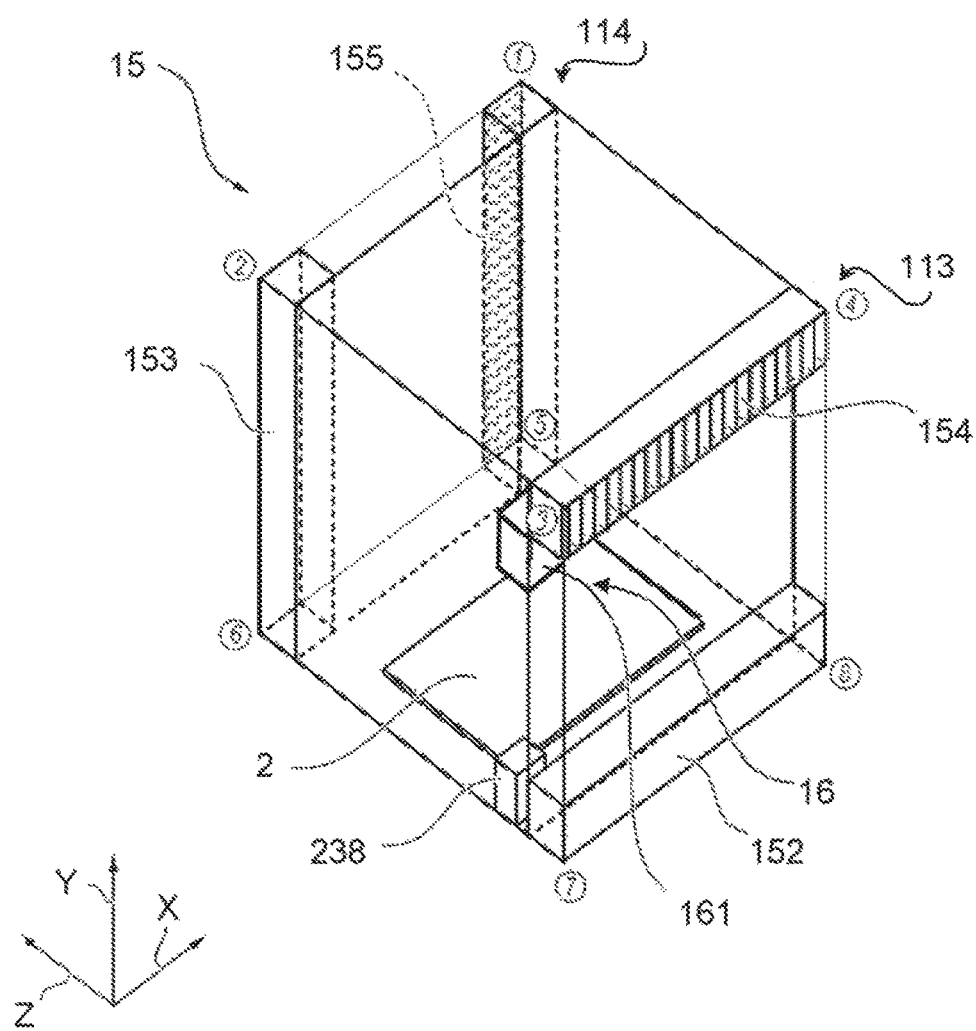
FIG. 12 in a perspective view shows a cab corresponding to the frame compartment from FIG. 8.
Figure 13:
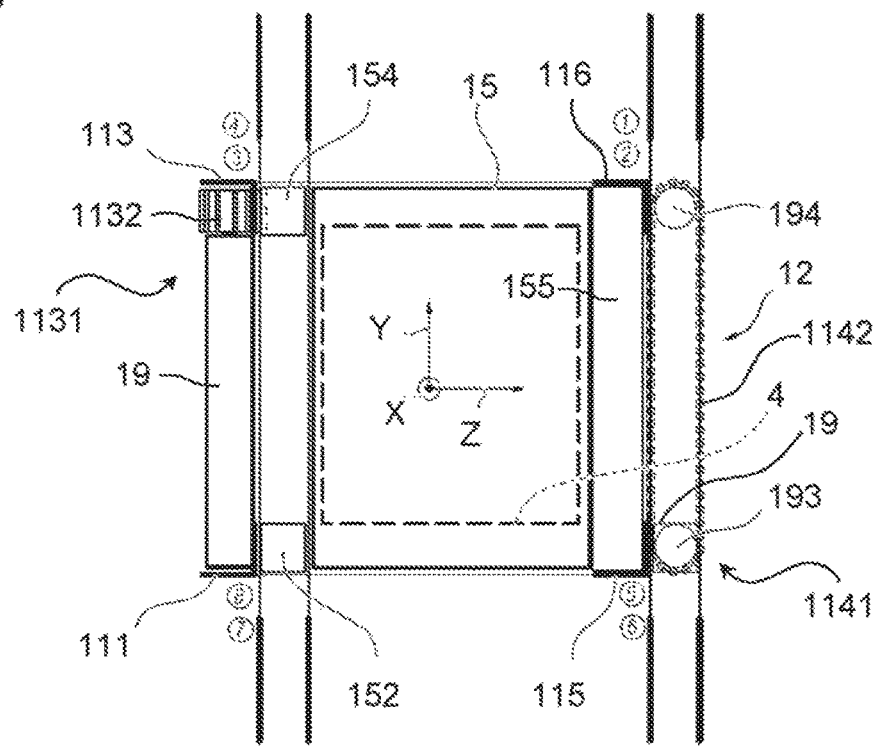
FIGS. 13-15 in an end-side view, a longitudinal side view, and a plan view, respectively, show in each case the cab from FIG. 12 disposed within the frame compartment from FIG. 8.
Figure 14:
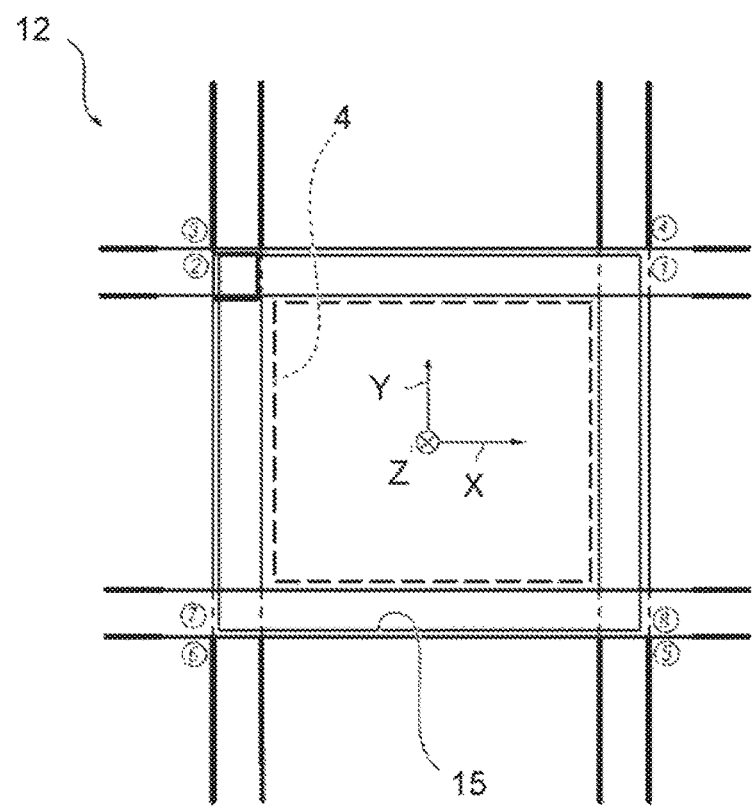
Figure 15:
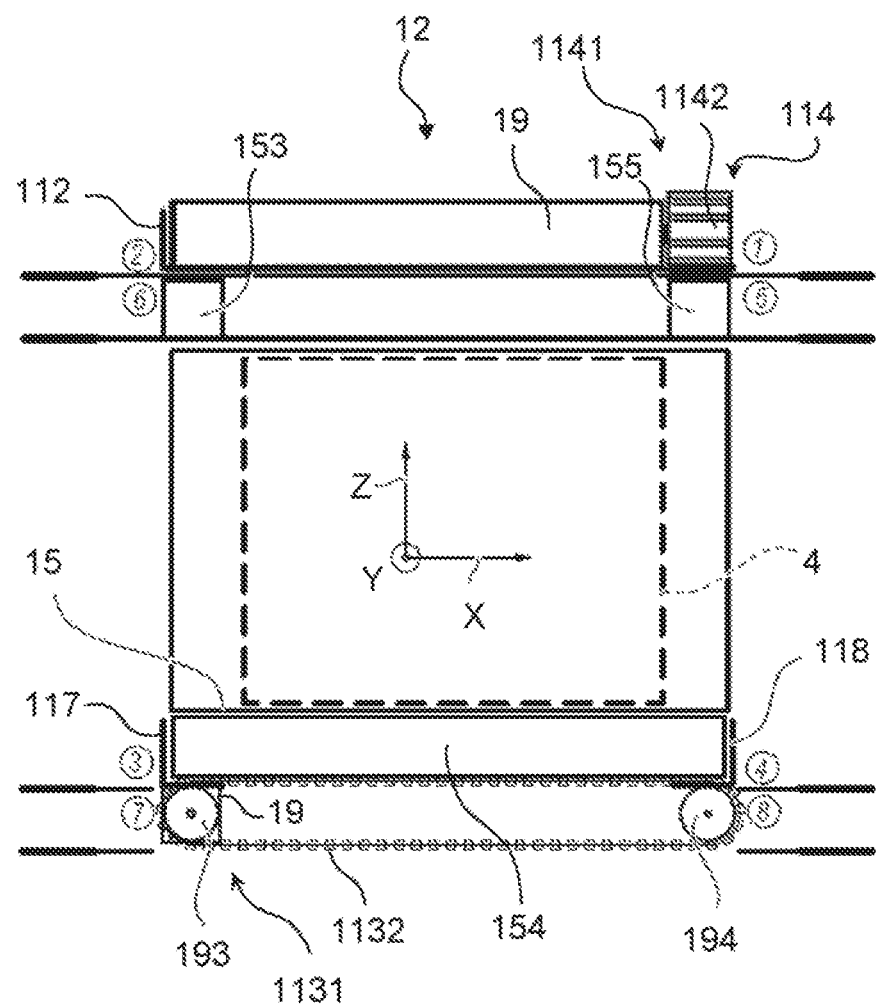

In an isometric illustration, in each case one of the frame compartments 12 is illustrated in FIGS. 6 to 9, and the cab 15 is partially illustrated in FIG. 12, wherein component parts of the device frame 11 are shown in FIG. 6. The corner points of FIGS. 6 to 9 and of FIG. 12 that are identified by the numerals 1 to 8 in the assembled state are congruent. The cab 15 having a stored goods item 4 located therein within the frame compartment 12 is shown in an end-side view, a longitudinal side view, and a plan view in FIGS. 13 to 15. The numerals 1 to 8 also herein correspond to the corner points shown in each case in FIGS. 6 to 9 and FIG. 12.

The device frame 11 illustrated has a first number of horizontal guide tracks 111, 115, 116 that run in the second horizontal direction X and in the vertical direction Y are disposed so as to be equidistant on top of one another, wherein each of the frame compartments 12 is assigned in each case one first horizontal guide track 111 which has a substantially L-shaped cross section. A first horizontal drive track 113 which likewise runs in the second horizontal direction X is disposed in the vertical direction Y above the first horizontal guide track 111. In each case one of the first horizontal drive tracks 113 is positioned between neighboring first horizontal guide tracks 111, 115, 116, said horizontal drive tracks 113 likewise being disposed so as to be equidistant on top of one another in the vertical direction Y. A second horizontal guide track 115 is disposed in the first horizontal direction Z so as to neighbour the respective first horizontal guide track 111, wherein the number of second horizontal guide tracks 115 of the device frame 11 corresponds to the number of first horizontal guide tracks 111 and is equal to the number of lines of the three-dimensional compartment matrix 13. Each of the frame compartments 12 furthermore has a third horizontal guide track 116 which likewise runs in the second horizontal direction X and in the first horizontal direction Z is spaced apart from the first horizontal guide track 111. In other aspects, the position of the third horizontal guide track 116 corresponds to that of the horizontal drive track 113.

Thus, one of the first horizontal guide tracks 111, one of the second horizontal guide tracks 115, one of the third horizontal guide tracks 116, and one of the horizontal drive tracks 113, which in particular form the edges of the respective frame compartment 12 that run in the second horizontal direction X and in each case preferably have a substantially L-shaped cross section are thus present per plane of the three-dimensional compartment matrix 13. All of the frame compartments 12 of the same plane are thus assigned the same first horizontal guide track 111, second horizontal guide track 115, and third horizontal guide track 116, and the horizontal drive track 113 which in a preferred design embodiment runs in the second horizontal direction X along the entire length of the device frame 11, wherein each frame compartment 12 preferably delimits one portion of the drive track 113 and the guide tracks 111, 115, 116, respectively.

Further component parts of the device frame 11 which has a second number of vertical guide tracks 112, 117, 118 which run in the vertical direction Y are illustrated in FIG. 7, wherein the second number corresponds to the number of columns of the three-dimensional compartment matrix 13. Each of the frame compartments 12 is again assigned one of the vertical guide tracks 112, 117, 118 and one drive track 114 (not illustrated), wherein each frame compartment 12 preferably delimits one portion of the drive track 114 or the guide tracks 112, 117, 118, respectively. The vertical guide tracks 112, 117, 118 in the second horizontal direction X are disposed so as to be equidistant beside one another, and are located in a plane having the second horizontal guide track 115 and the third horizontal guide track 116. Vertical drive tracks 114 which likewise run in the vertical direction Y and in the second horizontal direction X are positioned so as to be equidistant beside one another and so as to be between in each case neighboring vertical guide tracks 112, 117, 118 are furthermore located in the same plane. Furthermore, each of the frame compartments 12 is formed by means of second vertical guide tracks 117, the position of the latter in each case corresponding to that of the first vertical guide tracks 112, but being offset in the first horizontal direction Z. The device frame 11 furthermore has a number of third vertical guide tracks 118, the position of the latter corresponding to that of the vertical drive tracks 114, but likewise being offset in the first horizontal direction Z. The second vertical guide tracks 117 and third vertical guide tracks 118 are disposed in a plane having the first horizontal guide track 111 and the horizontal drive track 113. The first vertical guide tracks 112, vertical drive tracks 114, second vertical guide tracks 117, and third vertical guide tracks 118 run in each case across the entire extent of the device frame 11 in the vertical direction Y, and form substantially the edges of the respective frame compartment 12 that in each case run in the vertical direction Y.

The tracks 111 to 188, shown in FIGS. 6 and 7, which preferably each have an L-shaped cross section, are illustrated in FIG. 8 so as to be assembled to form one of the frame compartments 12. The individual tracks 111 to 118, at the assemblage points thereof, herein are fastened to one another such that two faces or planes, respectively, which are substantially planar and in the horizontal direction Z are mutually spaced apart are established, for example. Said faces or planes, respectively, by means of web 17, shown in FIGS. 4 and 5, which run in the first horizontal direction Z are fixed to one another so as to form the three-dimensional compartment matrix 13, for example.

Figure 9:
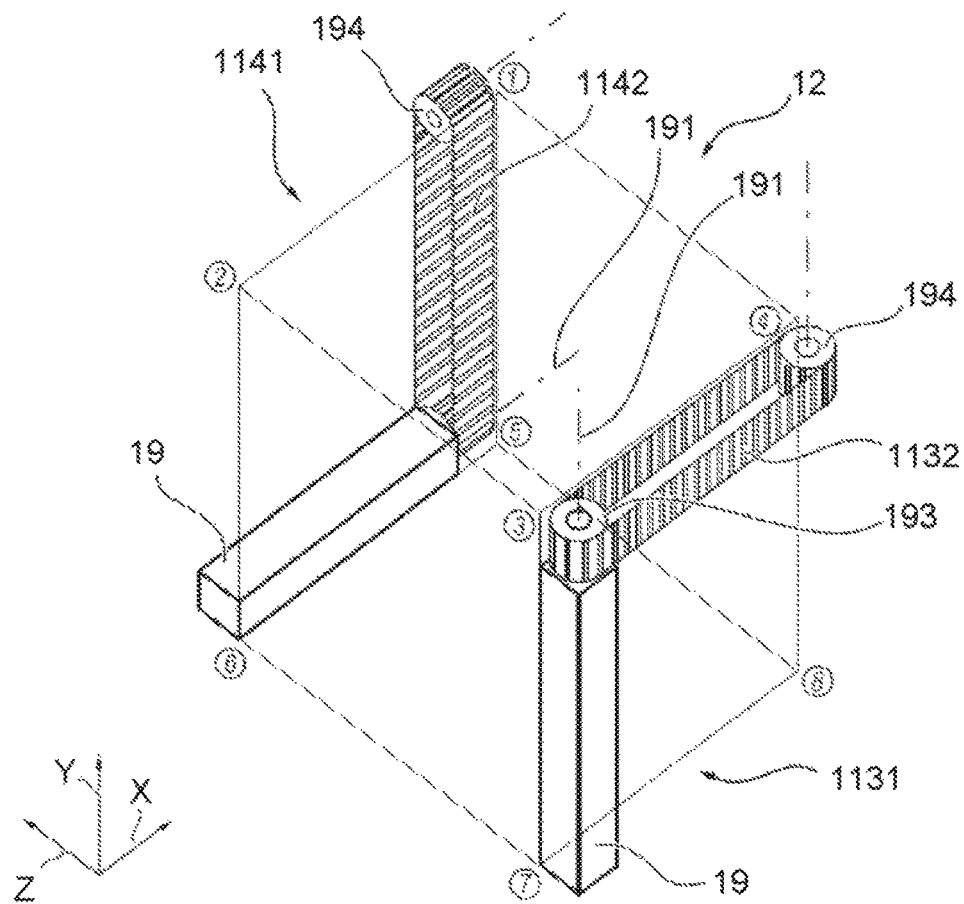
FIG. 9 in a perspective view shows two electromotive drives of the frame compartment from FIG. 8.

A first electromotive drive 1131 and a second electromotive drive 1141 of the frame compartment 12 are illustrated in FIG. 9. Consequently, each of the frame compartments 12 has two electromotive drives 1131, 1141, which are of substantially identical construction, but are mutually oriented in a dissimilar manner, and in particular can be servo drives. The first drive 1131 has an electric motor 19, the motor axis 191 thereof running in the vertical direction Y, and which by means of a first gear wheel 193 drives a double-cogged timing belt 1132 which by means of a second gear wheel 194 is tensioned in the second horizontal direction X. The second gear wheel 194 is either not separately driven, as is illustrated here, or the second gear wheel 194 is assigned a further electromotive drive (not illustrated). The electric motor 19 is fastened to the outside of the second vertical guide track 117, and the timing belt 1132 is positioned within a first clearance 1133 of the actively effective, horizontal drive track 113, wherein the teeth of the timing belt 1132 protrude through the first clearance 1133. The motor axis 191 of the second electromotive drive 1141 of identical construction, in particular a servo drive, runs in the second horizontal direction X, and the timing belt 114 by means of the second gear wheel 194 of the second drive 1141 is tensioned in the vertical direction Y, and is driven by means of the electric motor 19. The electric motor 19 of the second drive 1141, in particular a servo drive, in the assembled state is attached to the outside of the second horizontal guide track 115 of the frame compartment 12, and the timing belt 1142 in part protrudes through a second clearance 1143 of the actively effective, vertical drive track 114. The teeth of the timing belt 114 herein are in particular disposed within the frame compartment 12. The extent of the first clearance 1133 and of the second clearance 1143 in the respective direction is at all times smaller than the extent of the frame compartment 12 in the respective direction.

Figure 10:
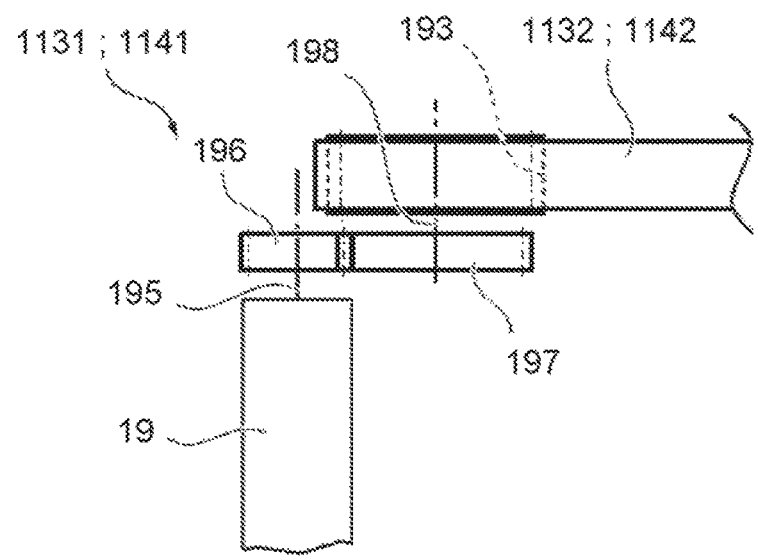
FIGS. 10, 11 in a plan view, or side view, respectively, show one of the drives.
Figure 11:
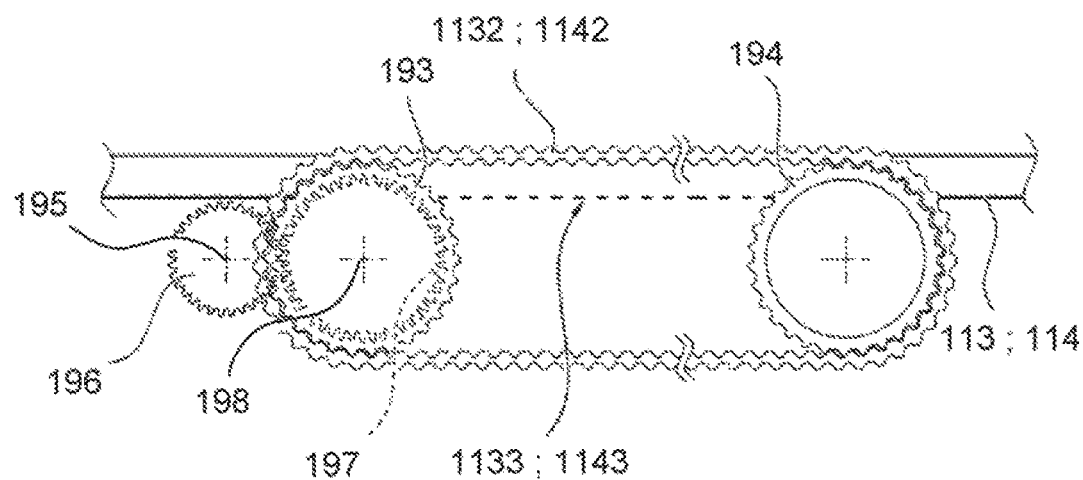

The first drive 1131, and the second drive 1141, respectively, are illustrated in a further embodiment in a plan view in FIG. 10 and in a side view in FIG. 11. The electric motor 19 by means of the motor shaft 195 thereof drives a gear wheel 196 on the motor, said gear wheel 196 being attached to the motor shaft 195 in a rotationally fixed manner. An intermediate gear wheel 197 which sits in a rotationally fixed manner on a drive shaft 198 to which the gear wheel 193 is likewise fastened in a rotationally fixed manner meshes with the gear wheel 196 on the motor. The gear wheel 196 on the motor and the intermediate gear wheel 197 have a finer cogging than the gear wheel 193 which has comparatively large teeth. The respective timing belt 1132, 1142 by means of the second gear wheel 194 is tensioned within the first clearance 1133, or the second clearance 1143, respectively, in such a manner that the teeth reach through the respective clearance 1133, 1143, wherein the electric motor 19, the gear wheel 196 on the motor, and the intermediate gear wheel 197 remain on one side of the clearance 1133, 1143. An engagement of teeth on the internal cogging of the timing belt 1132, 1142 by way of a half timing belt circumference by way of the intermediate gear wheel 197 is achieved herein, the latter being driven by the gear wheel 196 on the motor which has a finer cogging. The latter drives the gear wheel 193, having a larger cogging, for the internal cogging of the timing belt 1132, 1142, the latter additionally also having an external cogging. The gear wheel 196 on the motor, by way of the external cogging, thus drives the intermediate gear wheel 197 which in turn by means of the gear wheel 193 which has an enlarged diameter, drives the timing belt 1132, 1142 that is tensioned on said gear wheel 193.

A comparatively slim electric motor 19 can preferably be utilized as the electric motor 19. For example, each of the drives 1131, 1141 has two electric motors 19 which collectively form a so-called mechanically tensioned drive (not illustrated). The latter preferably comprises two synchronous servo motors which are mechanically interconnected, for example by means of a timing belt 1132, 1142, or by means of meshing gear wheels. The electric motors 19 are furthermore electrically interconnected in that the neutral point wiring of the first electric motor 19 is split, and in that the three phasing lines are connected to the neutral point wiring of the second motor 19. The two electric motors 19 in electrical terms are thus switched in series and preferably have the same nominal current. The two electric motors 19 are supplied by means of only one single inverter, wherein only one of the electric motors 19 has a position transducer. The orientation of the rotor poles, that is to say the polar wheel angle, of the two mechanically interconnected rotors of the two electric motors 19 in the final assembly is set in such a manner that the polar wheel angles in electrical terms are mutually offset by 90°. The field-oriented operation of this motor assembly now permits a torque differential between the two motor torques, on account of which a tensioning torque can be generated. Since two electric motors 19 are used, the required torque can be divided between the two electric motors 19. For example, each of the electromotive drives 1131, 1141, in particular each of the servo drives, has a converter, the latter thus being distributed in a decentralized manner. For example, said converters are located within a housing of the respective electric motor 19, or are flange-fitted to the end of the latter, so as to be opposite the gear wheel 196 on the motor.

The cab 15 in FIG. 12 is illustrated in a schematically simplified manner in an isometric view corresponding to that of FIGS. 6 to 9. The cab 15 is designed so as to be substantially cuboid and has the telescopic drive 2 preferably on the floor. The external side of the cab 15 is formed by means of a guide rod 152 that runs in the second horizontal direction X and of a second guide rod 153 that runs in the vertical direction Y. The two racks 154, 155 are mutually oriented so as to be skewed and consequently cross one another without intersecting one another. The guide rods 152, 153, and the racks 154, 155 of the cab 15 are preferably interconnected by webs 157 (cf. FIG. 5). In a repositioning movement of the cabs 15 in the second horizontal direction X, the first guide rod 152 slides along the first horizontal guide track 111 of the respective plane of the three-dimensional compartment matrix 13 and is thus guided by means of the latter. In a repositioning movement of the cab 15 in the vertical direction Y, the second guide rod 153 slides along the respective first vertical guide track 112 of the respective column of the three-dimensional compartment matrix 13 and is thus guided. In other words, the second guide rod 153 in this case is operatively connected to one of the first vertical guide tracks 112. The cab 15 furthermore has a first rack 154 which in the vertical direction Y is offset in relation to the first guide rod 153 and runs in the second horizontal direction X. The cab 15 furthermore comprises a second rack 155 which in relation to the second guide rod 153 is offset in the second horizontal direction X and runs in the vertical direction Y. The three-dimensional contours of the cab 15 are defined by means of the 4 rods 152, 153, 154, 155, and of the webs 157, wherein a receptacle space for the stored goods item 4 is provided within the contour.

The cab 15 in the assembled state is disposed in the first horizontal direction Z between the first horizontal guide tracks 111 and the first vertical guide tracks 112, and the extent (contour) of the cab 15 in the vertical direction Y is smaller than the mutual spacing of the first horizontal guide tracks 111. Furthermore, the extent (contour) of the cab 15 in the second horizontal direction X is smaller than the mutual spacing of the first vertical guide tracks 112. Consequently, the cab 15 in a repositioning movement in the second horizontal direction X is guided in each case by means of one of the first horizontal guide tracks 111, or in a repositioning movement in the vertical direction Y is guided in each case by means of one of the first vertical guide tracks 112. The second horizontal guide tracks 115 and third horizontal guide tracks 116 in the region of the assemblage point with the first vertical guide track 112 and the vertical drive track 114 have slots 18 such that the cab 15, and in particular the second guide rod 153 and the second rack 155, in a repositioning movement of the cab 15 in the vertical direction Y can be guided without impediment through said guide tracks 115, 116. The second vertical guide tracks 117 and the third vertical guide tracks 118 in the region of the assemblage points with the first horizontal guide track 111 and the horizontal drive track 113 also have slots 18 of this type, guiding of the first guide rod 152 and of the first rack 154 therethrough being enabled in a repositioning movement of the cab 15 in the second horizontal direction X. In order to achieve a repositioning movement of the cab 15, the respective drives 1131, 1141 are suitably energized, wherein the timing belt 1132, 142 engages with the respective rack 154, 155.

The cab 15 can thus be repositioned without impediment either in the second horizontal direction X or the vertical direction Y, wherein the respective guide tracks 115, 116, 117, 118, are provided by means of the slots 18 at the required locations. The timing belt 1132, 1142 is moved within the clearances 1133, 1143 of the respective drive tracks 113 or 114, respectively, wherein the respective rack 154 or 155 is passed on from one of the timing belts 1132 or 1142 to the timing belt 1132 or 1142, respectively, of the neighboring frame compartment 12. The abutment point of the two timing belts 1132, 1142 herein is travelled across by the respective rack 154 or 155, respectively, to which end the position of the teeth of the two timing belts 1132, 1142 is synchronized. For example, the teeth of the rack 155 or 154, respectively, in a repositioning movement in the second horizontal direction X or the vertical direction Y, respectively, and/or those teeth of the timing belts 1142, 1132 are diverged or converged, respectively, in the respective direction of the repositioning movement of the cab 15, thus permitting a horizontal or vertical, respectively, transverse displacement that is transverse to the respective cogging direction. The positions of the teeth of the respective rack 155, 154, or of the timing belts 1142, 1132, respectively, are synchronized herein. In order to avoid any direct impact between the tooth edges of the timing belts 1142, 1132 and of the racks 155, 154, the tooth edges of the racks 155, 154 are preferably configured so as to be chamfered (slanted). Only those drives 1131, 1141 of the in each case neighboring frame compartments 12 within which the cab 15 is located are expediently operated in the direction of the repositioning movement of the cab 15. In other words, according to the first design embodiment as per FIG. 2a and following, at all times a maximum of two of the drives 1131, 1141 of the entire device frame 11 are driven in a movement of only one single cab 15 in the repositioning direction.

The cab 15 furthermore supports the two racks 154, 155, the length of the latter corresponding to the cab 15 in the second horizontal direction X, or in the vertical direction Y, respectively. In a movement of the cab 15 in the second horizontal direction X, the first rack 154 engages with the timing belt 1132 of one of the first drives 1131 of one of the horizontal drive tracks 113. In a movement of the cab 15 in the vertical direction Y, the second rack 155 engages with the timing belt 1142 of one of the second drives 1141 of one of the vertical drive tracks 114. The cab 15 has a schematically illustrated power accumulator 238, preferably in the form of a rechargeable battery, by means of which the power supply to the gripper and/or to the telescopic drive 2 is performed. The cab 15 furthermore can have a first plug 161 which in the case of the stationary cab 15 electrically contacts a second plug 162 on the frame compartment 12, while configuring an electrical plug connection 16. Each of the frame compartments 12 is assigned one of the second plugs 162. The cab 15 by means of the plug connection 16 is supplied with electrical energy for charging the power accumulator 238 and for operating the gripper or the telescopic drive 2, respectively. Furthermore, items of information can be exchanged between the cab 15 and the device frame 11 by means of the electrical plug connection 16, a fieldbus being preferably used to this end. Alternatively or additionally, the power accumulator 238 can also be charged with electrical energy during the repositioning movement of the cab 15 by means of at least one dynamo that is set in rotation, preferably by means of at least one hub dynamo that is disposed in one of the guide wheels 159 of the cab 15 (not illustrated here).

In the case of the stationary cab 15 the gripper, or the telescopic drive 2, respectively, is thus operated by means of a drive (not illustrated in more detail), to which end the electrical plug connection 16 is used. The latter can furthermore be used for the transmission of signals pertaining to items of information from the locationally fixed device frame 11 to the cab 15 and back. The first plug 161 can be fastened to the cab 15, and the second plug 162 in the form of a socket can be fastened to the device frame 11. The telescopic drive 2 of the cab 15 is preferably configured as is described in DE 10 2016 117 941.8 of the applicant, or in the PCT application PCT/DE2017/xxxxx derived therefrom today, to the entire contents of which reference is additionally made. Accordingly, the telescopic drive 2 of the cab 15, by way of the table 27 thereof, can receive the stored goods item 4 in the form of a container 41. The table 27 herein preferably sits below the container body 411, between the two runners 412 of the container 41. Should the container 41 sit on the two runners 412 thereof in the storage compartment 32, the table 27 of the telescopic drive 2 by way of the cab 15 is to be positioned in the vertical direction Y in such a manner that the table 27 can drive in or out of, respectively, between the two runners 412 once the container 41 has been deposited on a storage compartment floor 321 within the storage compartment 32. Should the table 27 of the telescopic drive by way of the cab 15 be lifted in the vertical direction Y, the container 41 is likewise lifted and can now be repositioned in the first horizontal direction Z (cf. FIG. 18*a*).

This comparatively minor movement in the vertical direction Y is carried out in particular by means of the second drive 1141. In the case of the electrical plug connection 16 being present herein, the second plug 162 is movable by specifically this vertical movement in relation to a locationally fixed point. This is performed, for example, by way of a comparatively small cabled rack chain (cf. FIG. 18*b*).

Each frame compartment 12 can furthermore have a lifting solenoid 163 which serves for establishing and/or releasing the electrical plug connection 16. If the electrical plug connection 16 is established, the second plug 162 which has been fixedly held to the lifting solenoid 163 by means of an electromagnet, is released as soon as the cab 15 is to be moved, for example. The second plug 162 is in particular released from the lifting solenoid 163 in the case of the vertical movement Y for lifting the stored goods item 4 being carried out. After the vertical movement Y has been performed, the second plug 162 is again pulled from the first plug 161 by means of the lifting solenoid 163 and of the electromagnet, said plugs thus being repositioned to the initial position thereof.

Figure 16A:
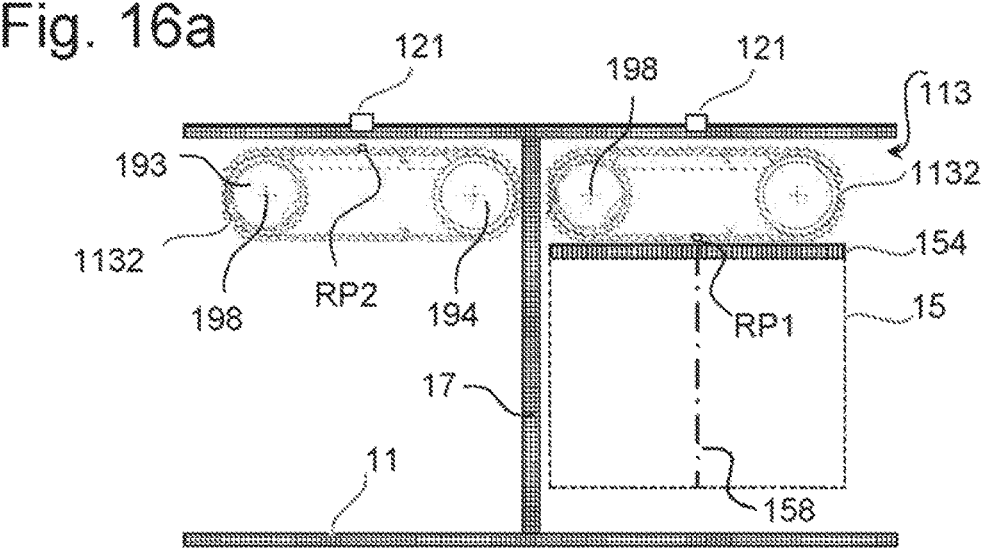
FIGS. 16a-c in a plan view show the transfer of a cab between two neighboring frame compartments within a storage and retrieval device.
Figure 16B:
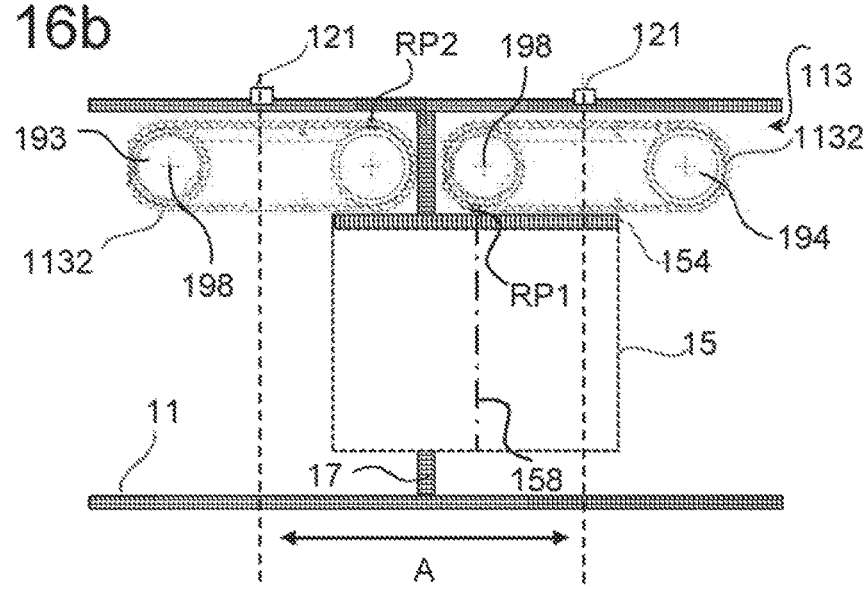
Figure 16C:
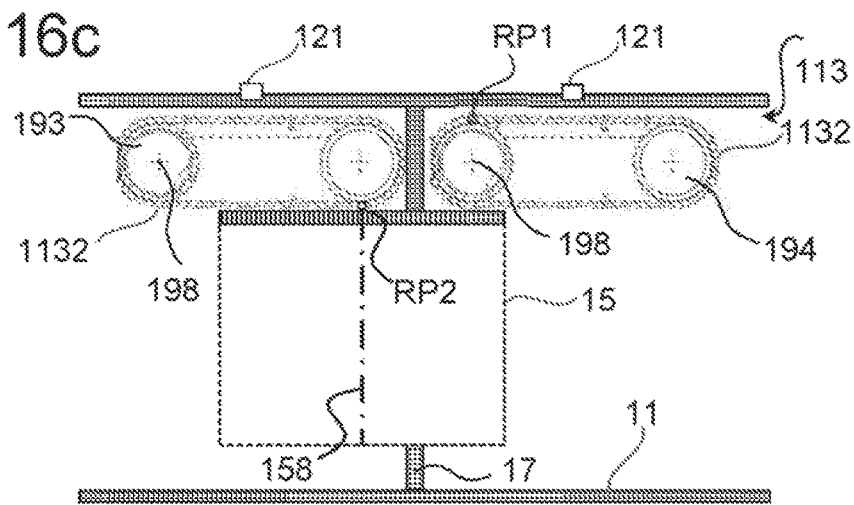

FIGS. 16*a-c* in a plan view show the transfer of a cab 15 between two neighboring frame compartments 12 within a storage and retrieval device 1. As can be seen, at least one, preferably each as illustrated, frame compartment 12 of the device frame 11 comprises a measuring system 121 for measuring an absolute value of a repositioning movement of the cab 15. The measuring system 121 herein can be configured as an absolute position measurement system and/or preferably as an incremental transducer and a means for position determination. In the repositioning of the cab 15 within a device frame 11, in a first method step position values RP1, RP2 of the timing belts 1132, 1142, here illustrated of the first timing belt 1132, of mutually neighboring frame compartments 12, and a position 158 of the cab 15 within the frame compartment 12 in which the cab 15 is currently located, can be advantageously determined. In order for the position 158 of the cab 15 to be determined, a mark can be disposed on the first rack 154 of said cab 15, and/or on the second rack 155 illustrated in FIG. 12. Both the position value RP1 of the timing belt 1132 (in an analogous manner in the case of the timing belt 1142 from FIG. 9) as well as the position 158 of the cab 15 within the frame compartment 12 in which the cab 15 is currently located, can thereafter be advantageously defined as the relative zero point (FIG. 16*a*).

According to the invention, the position value RP2 of the timing belt 1132 or 1142 of the frame compartment 12 that follows in the movement direction of the cab 15 can then preferably be synchronized with the position value RP1 of the timing belt 1132 or 1142 of the frame compartment 12 in which the cab 15 is currently located. On account thereof, the position 158 of the cab 15 that has been determined in the first method step, and the position value of the timing belt 1132 or 1142 which is disposed in the currently accessed frame compartment 12 can be advantageously relayed to the timing belt 1132 or 1142 that in each case follows in the movement direction of the cab 15. On account thereof, the timing belt 1132 or 1142 that in each case follows in the direction of the repositioning movement of the cab 15 can according to the invention be preferably aligned in the context of a "positioning in relation to a moving target" to the position 158 of the cab 15, or to the position value RP1 of the preceding timing belt 1132, respectively, prior to the cab 15 being transferred.

It is shown in FIG. 16*b* how the cab 15 in a next method step by moving the timing belt 1132 or 1142 of the currently accessed frame compartment 12 is displaced by a spacing A in the direction of the repositioning movement of the cab 15, wherein the spacing A is in particular the spacing between the centers of two frame compartments 12 that are neighboring in the direction of the repositioning movement of the cab 15.

It can be seen in FIG. 16*c* upon a transfer of the cab 15 having been performed into the frame compartment 12 that within the device frame 11 follows in the direction of the repositioning movement of the cab 15, the position value RP2 of the timing belt 1132 or 1142 in the frame compartment 12 in which the cab 15 is located upon having been transferred can preferably be defined as the new relative zero point. This resetting of the positional values and/or position values of the cab 15, or of the timing belts 1132, 1142 after a transfer has been performed from a current frame compartment 12 to the frame compartment 12 that in each case follows in the direction of the repositioning movement of the cab 15 advantageously enables the mathematical correction of any potential deviation of the nominal positional values and/or nominal position values from the respective actual values that arises during the repositioning movement on account of slippage, for example.

This method that is preferred according to the invention advantageously enables a synchronicity between the cogging of the rack 154, 155 and the respective timing belt 1132, 1142 to be guaranteed, said synchronization being required for a repositioning movement transverse to the cogging direction. Since the cogging position of the racks 154, 155 of the cab 15 is at least in portions established by the repositioning movement of the cab 15 in the guide tracks 111, 115, 116; 112, 117, 118, it is herein advantageously taken into account that the position values RP1, RP2 of the respective timing belts 1132 or 1142 are to be set to the position 158 of the cab 15.

The invention is not limited to the exemplary embodiments described above. Rather, other variants of the invention can be derived therefrom by a person skilled in the art, without departing from the subject matter of the invention. Furthermore, in particular all individual features that have been described in the context of the individual exemplary embodiments can also be combined with one another in another manner without departing from the subject matter of the invention.

Figure 17:
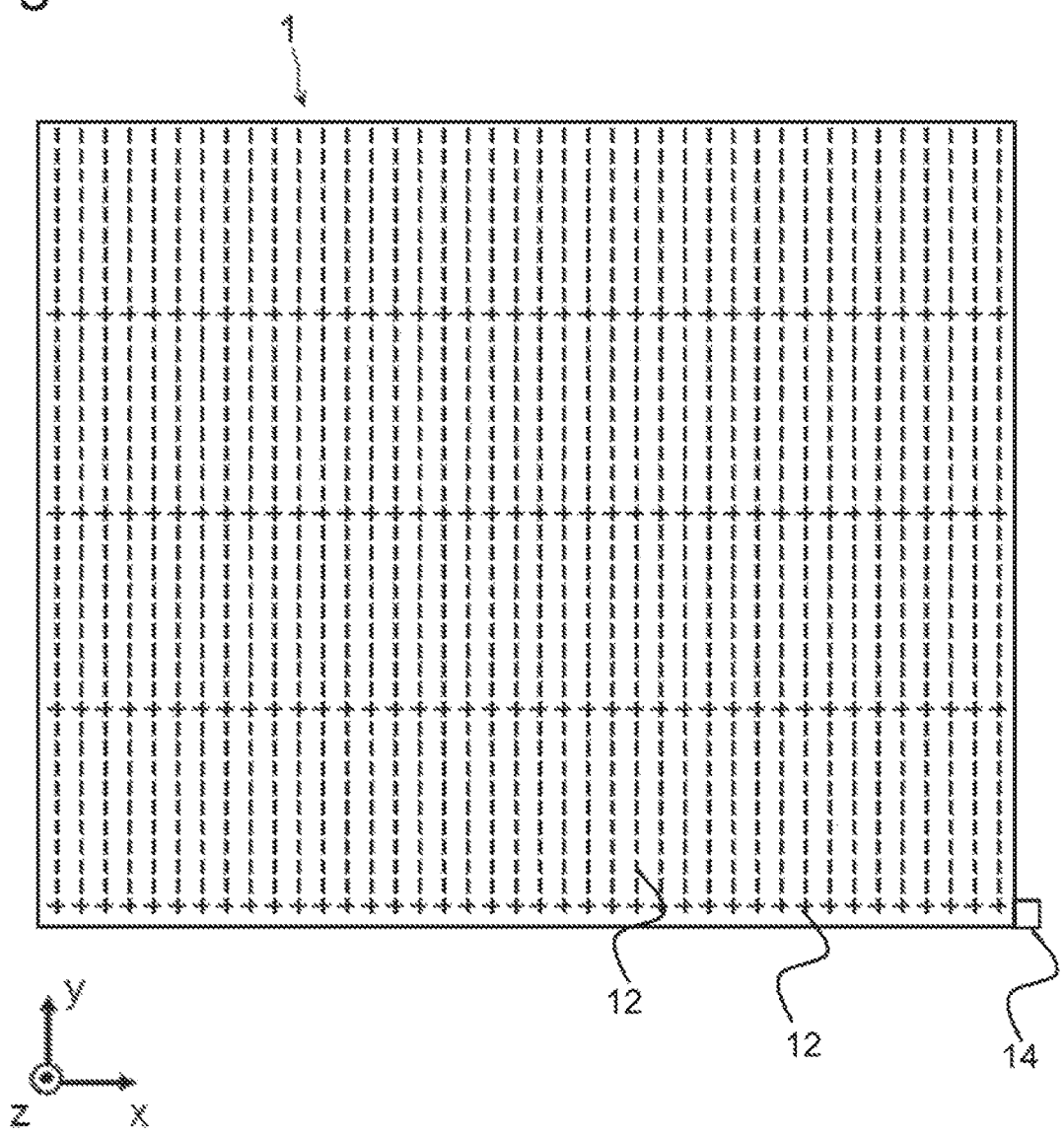
FIG. 17 shows a second design embodiment of a device frame of a storage and retrieval device in a longitudinal side view.

FIG. 17 in an exemplary manner thus shows a second design embodiment of a device frame 11 of a storage and retrieval device 1 in a longitudinal side view (thus with a view along the first horizontal direction Z), in which a cab 15 that serves for receiving a stored goods item 4, electromotively driven, within the three-dimensional compartment matrix 13 is movable so as to be repositioned from each frame compartment 12 in a vertical direction Y, and from each eleventh frame compartment 12 in a second horizontal direction X (in each case symbolized by a plus symbol in FIG. 17). A "grid layout" of this type advantageously enables in particular first electromotive drives 1131 to be saved, while maintaining an almost identically rapid reachability of the individual frame compartments 11 by the cab 15 and thus an almost identical flexibility in the operation of the storage and retrieval device 1.

In other design embodiments (not illustrated) of the present invention, the grid layout, thus the sequence of rows of frame compartments 12 from which the cab 15 is repositionable in a vertical direction Y and in a second horizontal direction X, can be advantageously varied, in particular depending on customer requirements, wherein the lowermost row of frame compartments 12 particularly preferably is at all times one of the rows of frame compartments 12 from which the cab 15 is repositionable in a vertical direction Y and in a second horizontal direction X. It is furthermore advantageous for at least one loading compartment 14 for loading and/or unloading to be disposed on this row of frame compartments 12.

Figure 18A:
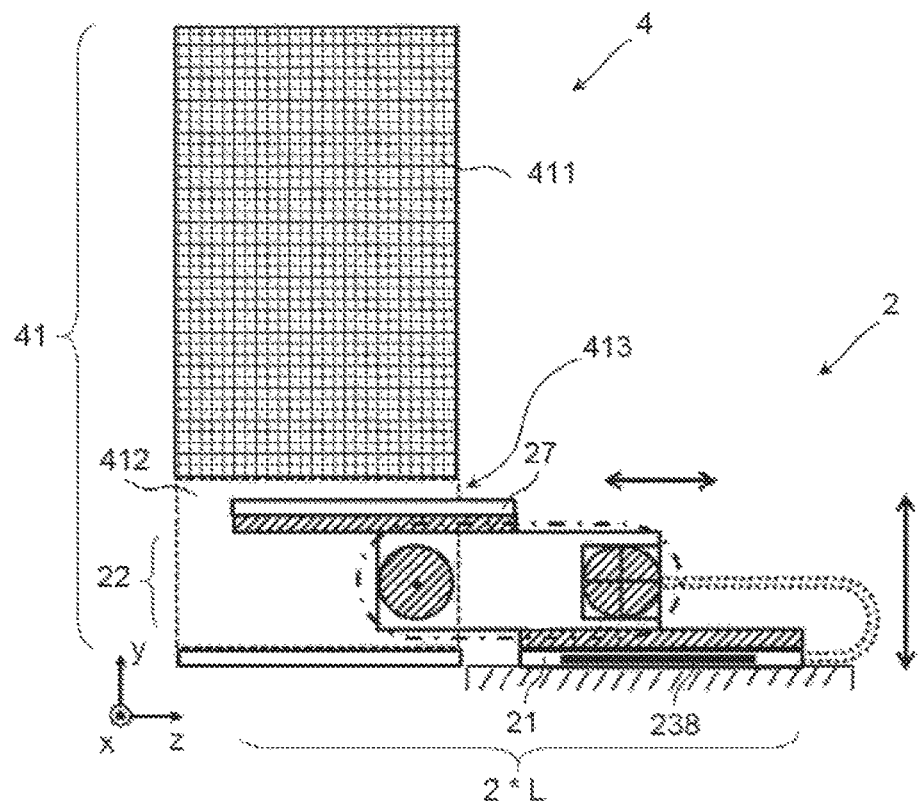
FIG. 18a in a side view shows a deployed telescopic drive at the moment of having just performed the depositing of a typical stored goods item, in particular a container.
Figure 18B:
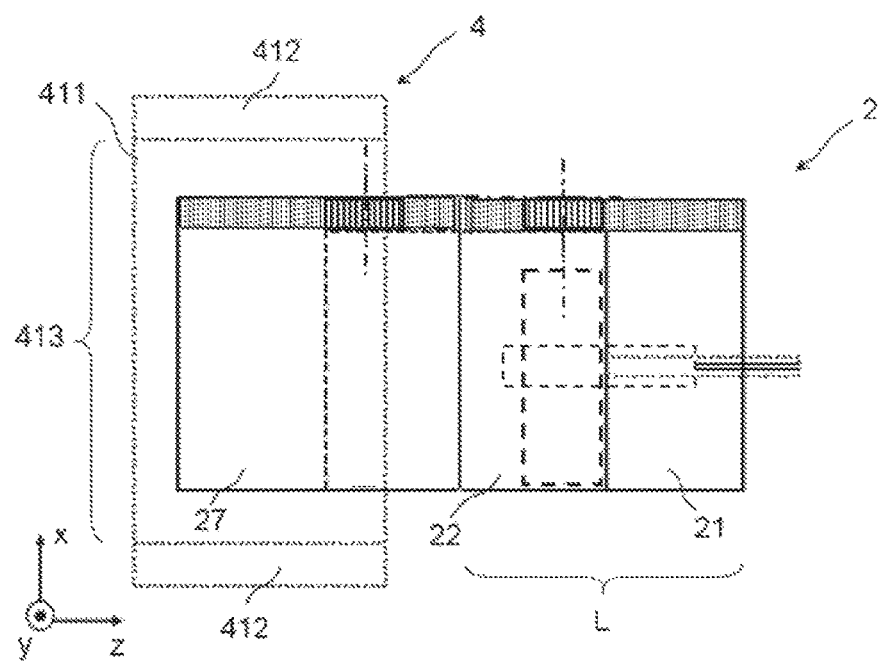
FIG. 18b shows the deployed telescopic drive from FIG. 18a in a plan view.

Finally, FIG. 18a in a side view, and FIG. 18b in a plan view, show the deployed telescopic drive 2 of the cab 15 of a storage and retrieval device 1 that is preferred according to the invention, at the moment of having just performed a depositing of a typical stored goods item 4, in particular a container 41. It can be seen how the respective total stroke of the telescopic drive 2 must be at least twice the length of a base L (2*L) of the telescopic drive 2 if the stored goods item 4 is to be acquired therebelow across the entire width thereof. FIGS. 18a and 18b herein, in an exemplary manner show a repositioning movement in the first horizontal direction Z that has already been brought back to 2*L. As a result thereof, it is possible for two mutually neighboring storage frames 31 that are adjacent to the same warehouse aisle 33 to be supplied by means of the same storage and retrieval device 1, wherein the table 27 of the telescopic drive 2 that supports the stored goods item 4 can be deployed into a clearance 413 between the runners 412 of the container 41, or into a comparable void below the stored goods item 4. The maximum deployment length in the first horizontal direction Z is enlarged by virtue of a first slide 22 and of the table 27 disposed thereon. The depositing or lifting, respectively, of a typical stored goods item 4 can be advantageously performed by a repositioning movement of the cab 15 (represented by only the cab floor 151 in FIG. 18a) in the vertical direction Y.

The interaction between the timing belts 1132; 1142, the racks 154; 155, the guide tracks 111; 115; 116; 112; 117; 118, and the guide wheels 159 in a third variant that is preferred according to the invention of the first design embodiment of the device frame 11 of a storage and retrieval device 1 in a repositioning movement of the cab 15, initially in the second horizontal direction X, and subsequently the vertical direction Y, by means of in each case two horizontal drive tracks 113, 113' and two vertical drive tracks 114, 114', and of guide tracks 115, 116, 117, 118 is finally visualized in FIGS. 19a to 19h. The third variant, described hereunder, differs in relation to the first variant (FIGS. 4 and 5) and to the second variant (in particular FIGS. 6 to 8) in that in each case two horizontal drive tracks 113, 113', and two vertical drive tracks 114, 114', are disposed within the three-dimensional compartment matrix 13.

Figure 19A:
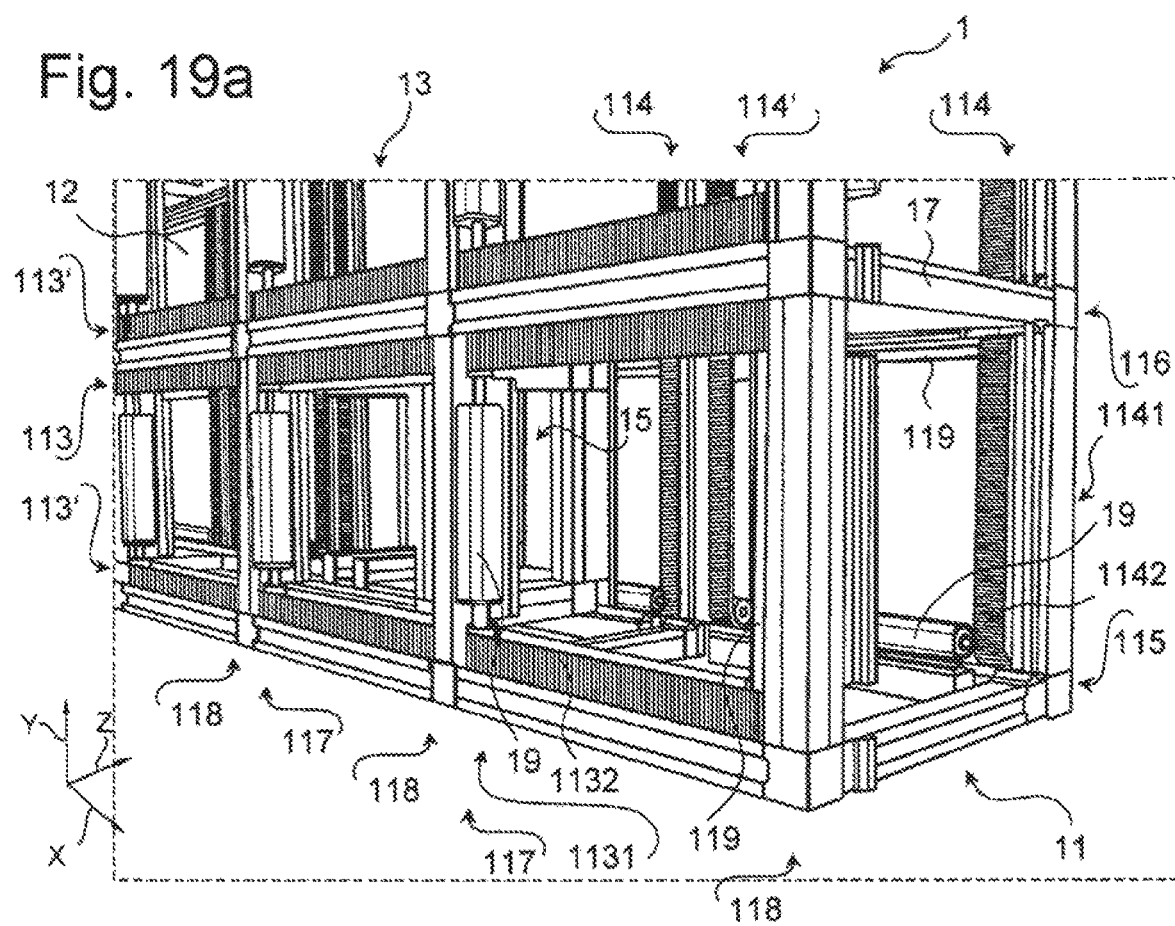
FIGS. 19a-h show the interaction between the timing belts, the racks, the guide tracks, and the guide wheels in a preferred third variant according to the invention of the first design embodiment of the device frame of a storage and retrieval device, in a horizontal movement and a subsequent vertical movement of the cab by means of in each case two horizontal and two vertical drive tracks and guide tracks.

FIG. 19a shows part of the device frame 11 of a storage and retrieval device 1 according to the invention, having a cab 15 that is horizontally moved for repositioning in the lowermost row of the frame compartments 12. The device frame 11 herein is advantageously formed from frame compartments 12 that are disposed so as to form a three-dimensional compartment matrix 13. A device frame 11 of this type, by virtue of the three-dimensional construction mode thereof, can advantageously offer sufficient inherent stability for precise guiding in order to enable rapid repositioning movements of the cab 15 in a vertical direction Y and/or in a second horizontal direction X. This is advantageous in particular since high-bay warehouses 3 usually are not ideal rigid structures but, for example by virtue of temperature variations and/or mechanical influences, can tend to move, in particular fluctuate. Such dynamic movements can cause deviations in the magnitude of several millimeters in terms of the respective current position and/or alignment of the high-bay warehouse 3, or of neighboring high-bay warehouses 3, said deviations potentially exceeding the tolerance level in particular for a conveyor basket, or truck that moves between two neighboring high-bay warehouses 3 (as is proposed in the prior art cited at the outset). By contrast, a storage and retrieval device 1 according to the invention is advantageously not influenced by the described movements of the adjacent high-bay warehouses 3, or storage compartments 32, since the rigid construction of said storage and retrieval device 1 from frame compartments 12 that are disposed so as to form a three-dimensional compartment matrix 13 guarantees consistent guiding of the cab(s) 15 therein that is independent of any potential movements of adjacent high-bay warehouses 3 acting thereon.

The device frame 11 of the storage and retrieval device 1, in particular each frame compartment 12, can moreover advantageously comprise the electromotive drives 1131 and 1141. On account of a locationally fixed arrangement of the electromotive drives 1131 and 1141 in the device frame 11, wherein each frame compartment 12 preferably comprises only one first electromotive drive 1131 and one second electromotive drive 1141, no cable track chains or current pickups are required for linking the electrical output and the electrical signals such as by way of a fieldbus, for example.

Moreover, each cab 15 in a storage and retrieval device 1 designed in such a manner can advantageously reach each storage compartment 32, in particular also a neighboring storage compartment 32, independently of other cabs 15, and a plurality of cabs 15 can be moved for repositioning in a mutually independent manner and simultaneously (also in a parallel operation), this herein also being referred to as a "massive parallel operation" of a high-bay warehouse 3.

Figure 19B:
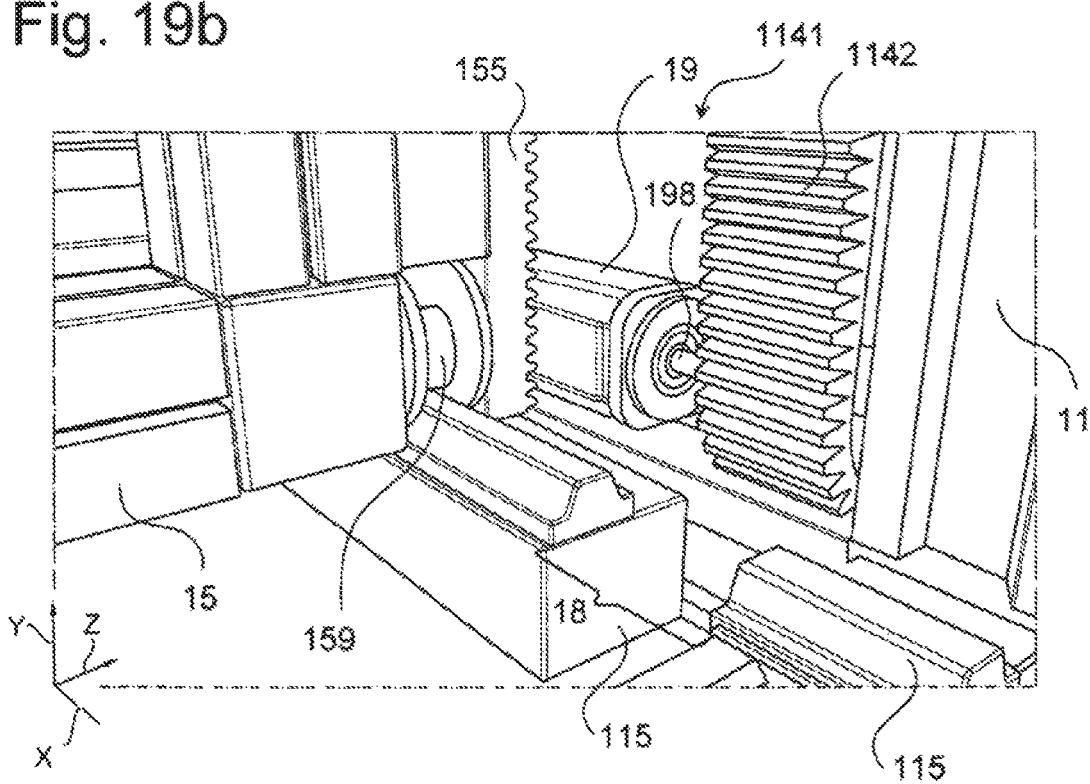

FIG. 19b in an enlarged illustration shows the cab 15 from FIG. 19a shortly prior to reaching the end of a frame compartment 12. The cab 15 in this design embodiment advantageously runs on guide wheels 159 having rotation axes that point in the first horizontal direction Z, said guide wheels 159 preferably being disposed on the eight corners of the cab 15. The guide wheels 159 toward the frame side can advantageously be covered by the racks 154 and 155, the second rack 155 being illustrated to this end here, on account of which the length of the racks 154 and 155 can advantageously extend across the entire respective lateral length of the cab 15. The guide tracks 115, 116; 117, 118, within which the repositioning movement of the cab 15 is performed, here in the horizontal direction X, can advantageously be configured as linear guide rails as illustrated, said linear guide rails preferably having a profile that matches the guide wheels 159.

It can be furthermore seen in FIG. 19*b* that the guide tracks 115, 116; 117, 118 in portions can advantageously have interruptions for the passage of the guide wheels 159 and for the racks 154 and 155 that run perpendicularly to the respective guide track 115, 116; 117, 118. The interruptions are preferably slots 18 on the respective ends of a frame compartment 12, as can be seen in FIGS. 19*b* to *d*.

Figure 19C:
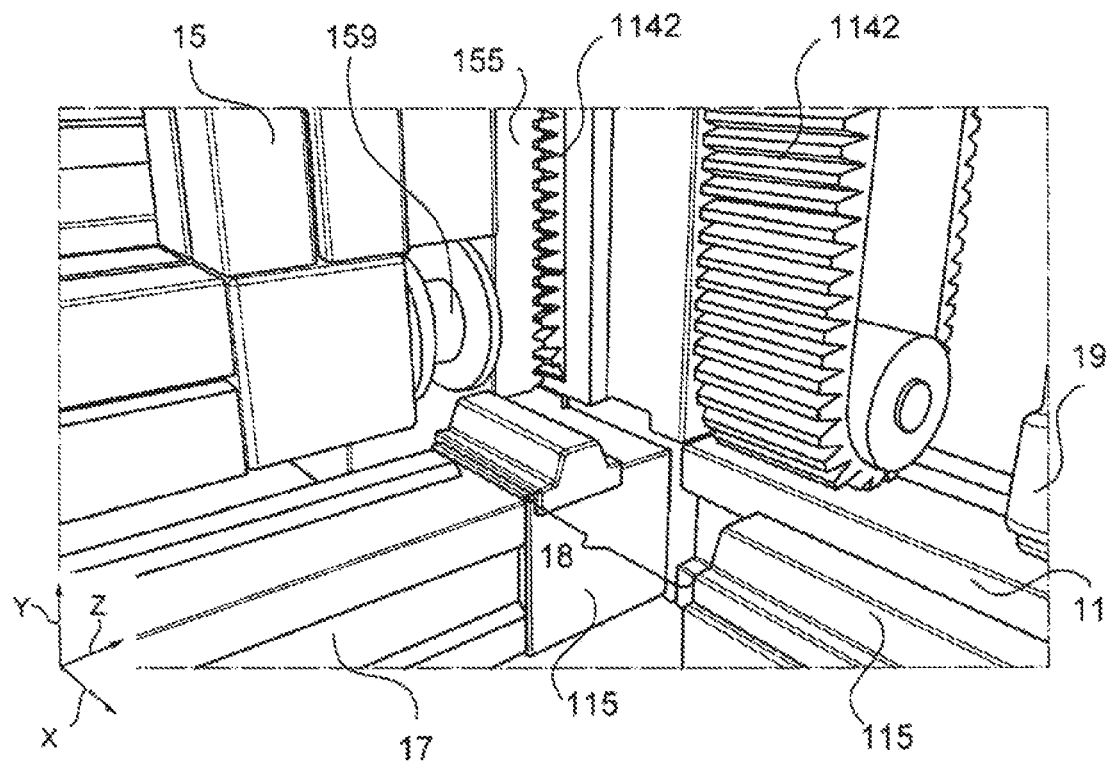

FIG. 19*c* shows how the cab 15 is just travelling across a slot 18 of this type, or over a slot-type interruption, respectively. It can be seen that for an unimpeded repositioning movement in the second horizontal direction X the teeth of the second rack 155 which runs in the vertical direction Y have to be synchronized with the second timing belt 1142 that is likewise tensioned in the vertical direction Y. The same applies in analogous manner in the case of a repositioning movement of the cab 15 in the vertical direction Y to the first rack 154, which in this instance is disposed perpendicularly to said repositioning movement, and to the first timing belt 1132. The cab 15 in the region of the interruption, here of the slot 18, is held in position by the combination of the timing belt 1132; 1142 two and the rack 154; 155.

In as far as the cab 15 having the rack 155 is now located directly above or below, respectively, the slot 18, a repositioning movement in the vertical direction Y can be performed, this being described hereunder.

Figure 19D:
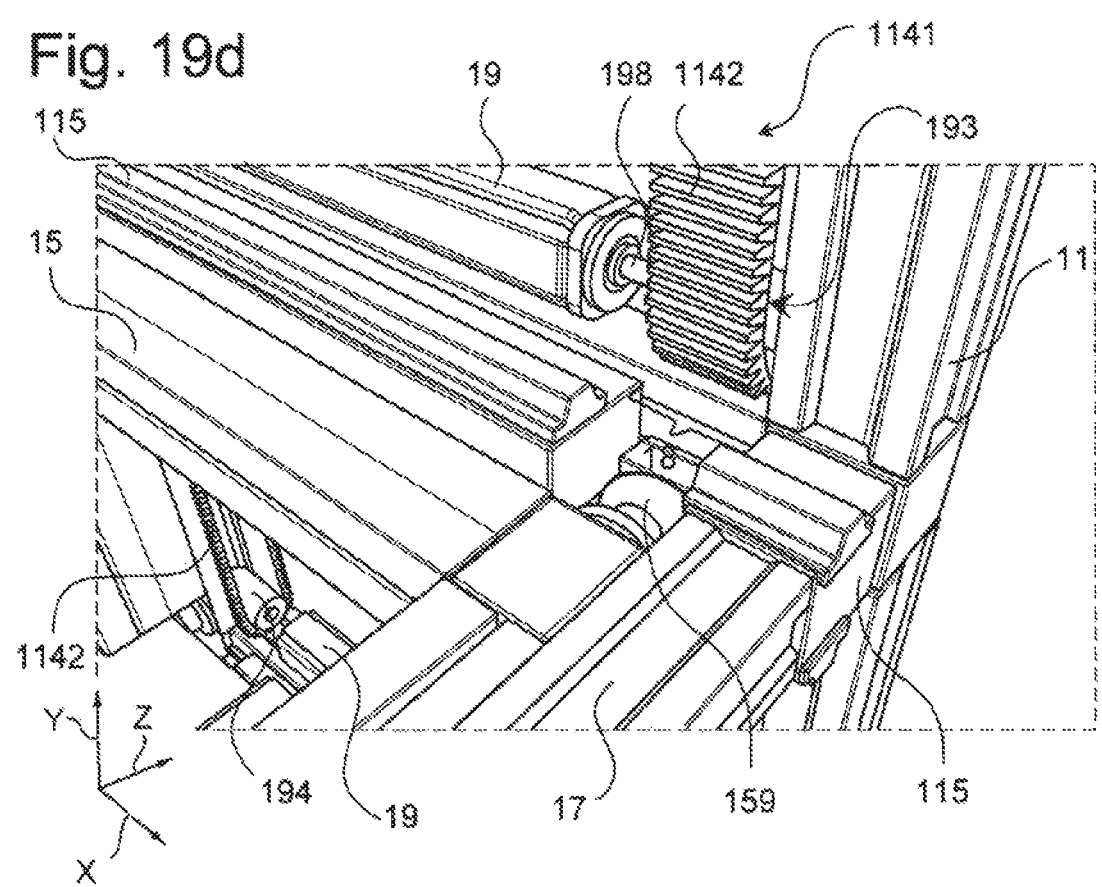
Figure 19E:
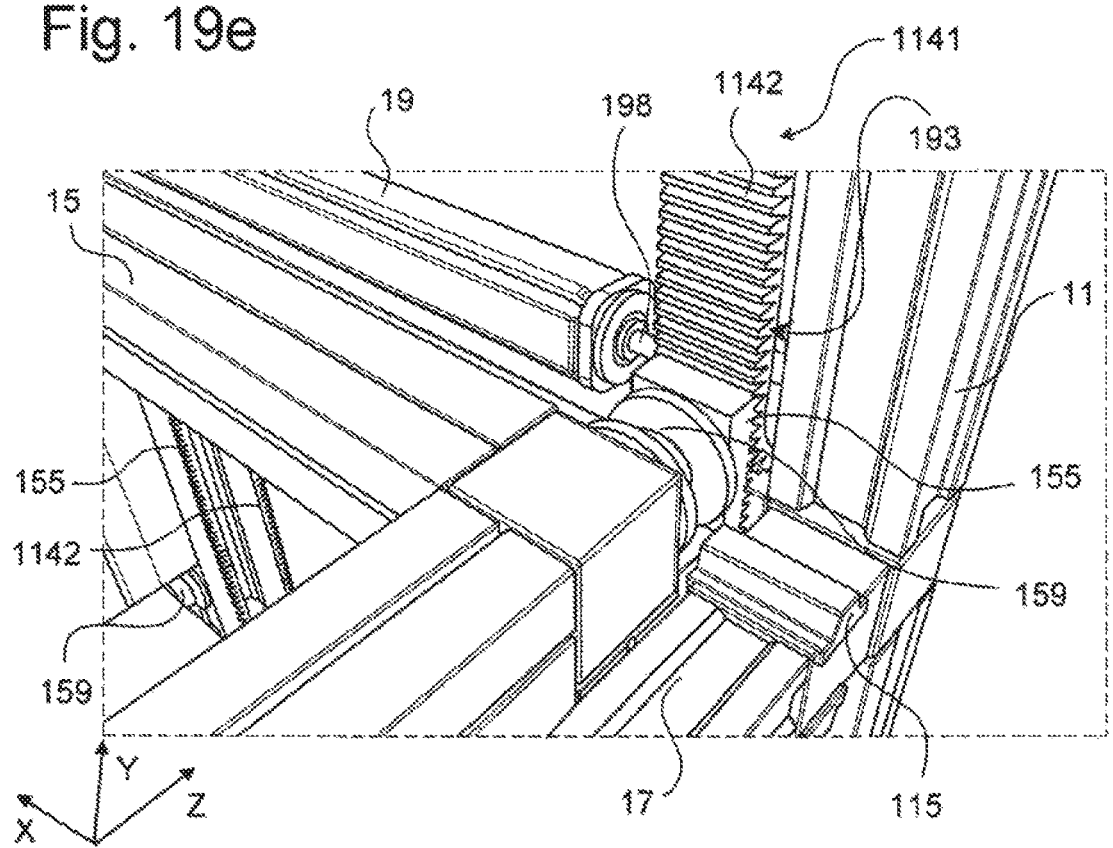

FIGS. 19*d* and 19*e* show an enlarged fragment of the cab 15 during the repositioning movement in the vertical direction Y within a storage and retrieval device 1 in a perspective plan view. FIG. 19*d* herein shows the point in time shortly prior to a slot 18 being passed by the rack 155 and by the guide wheel 159. FIG. 19*e* then shows the stage during the passage, wherein that part of the rack 155 that in the vertical direction Y whose the upper part is received by the second timing belt 1142 of the frame compartment 12 that follows in the vertical direction. It can be seen that the rack 155 is passed on from the second timing belt 1142 of the current frame compartment 12 to the second timing belt 1142 of the frame compartment 12 that follows in the vertical direction Y, wherein the abutment point of the two timing belts 1142 is travelled across by the rack 155. To this end, the positions of the teeth of the two timing belts 1142 of neighboring frame compartments 12 are capable of being synchronized (cf. above at FIG. 16). The same applies in an analogous manner in the case of a repositioning movement of the cab 15 in the second horizontal direction X to the first rack 154 and to the first timing belt 1132 of a horizontally neighboring frame compartments 12.

Figure 19F:
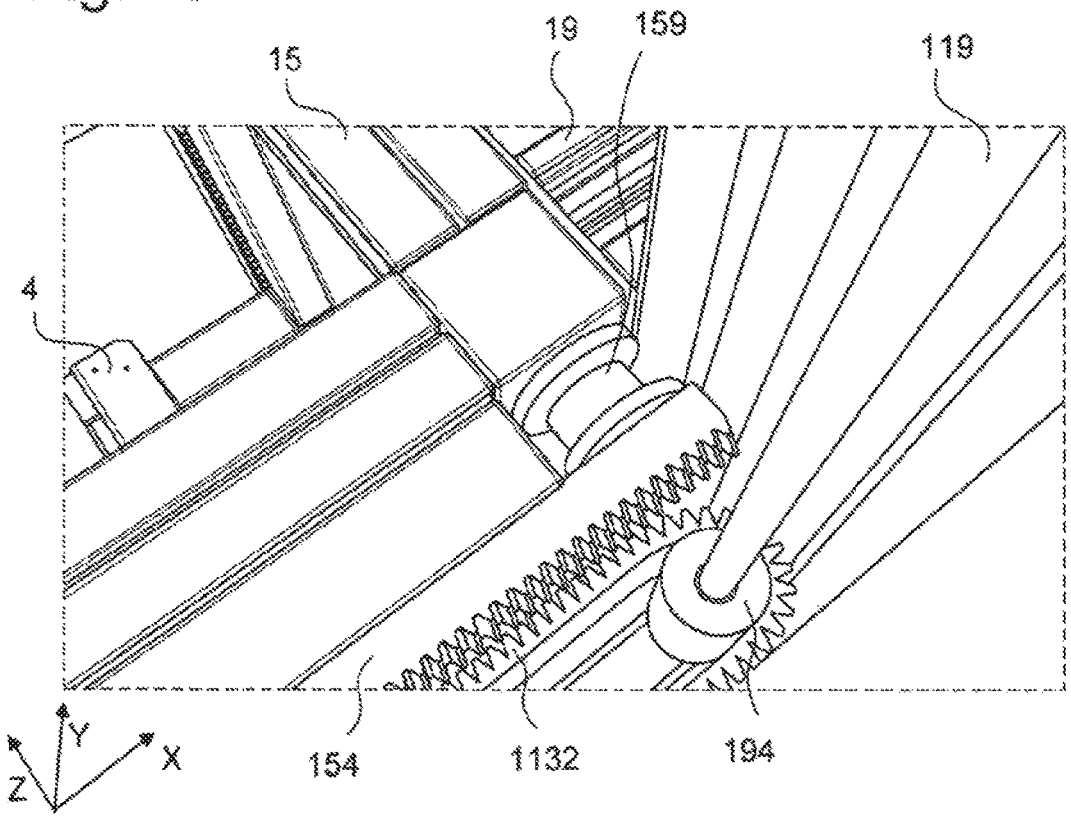

In a perspective plan view it is illustrated in FIG. 19*f* that for an unimpeded repositioning movement in the vertical direction Y the teeth of the first timing belt 1132, which is tensioned in the second horizontal direction X, are aligned to the first rack 154 that likewise runs in the second horizontal direction X. It can be furthermore seen in FIG. 19*f* that in the case of a design embodiment having in each case two timing belts 1132 that are tensioned in the horizontal direction X, and correspondingly two racks 154 that are disposed so as to be mutually parallel on the cab 15, the second gear wheels 194 of timing belts 1132 that are disposed so as to be mutually parallel and run in the same direction can advantageously be operatively interconnected by way of the connection shaft 119 (cf. to this end also FIG. 19*g*).

Figure 19G:
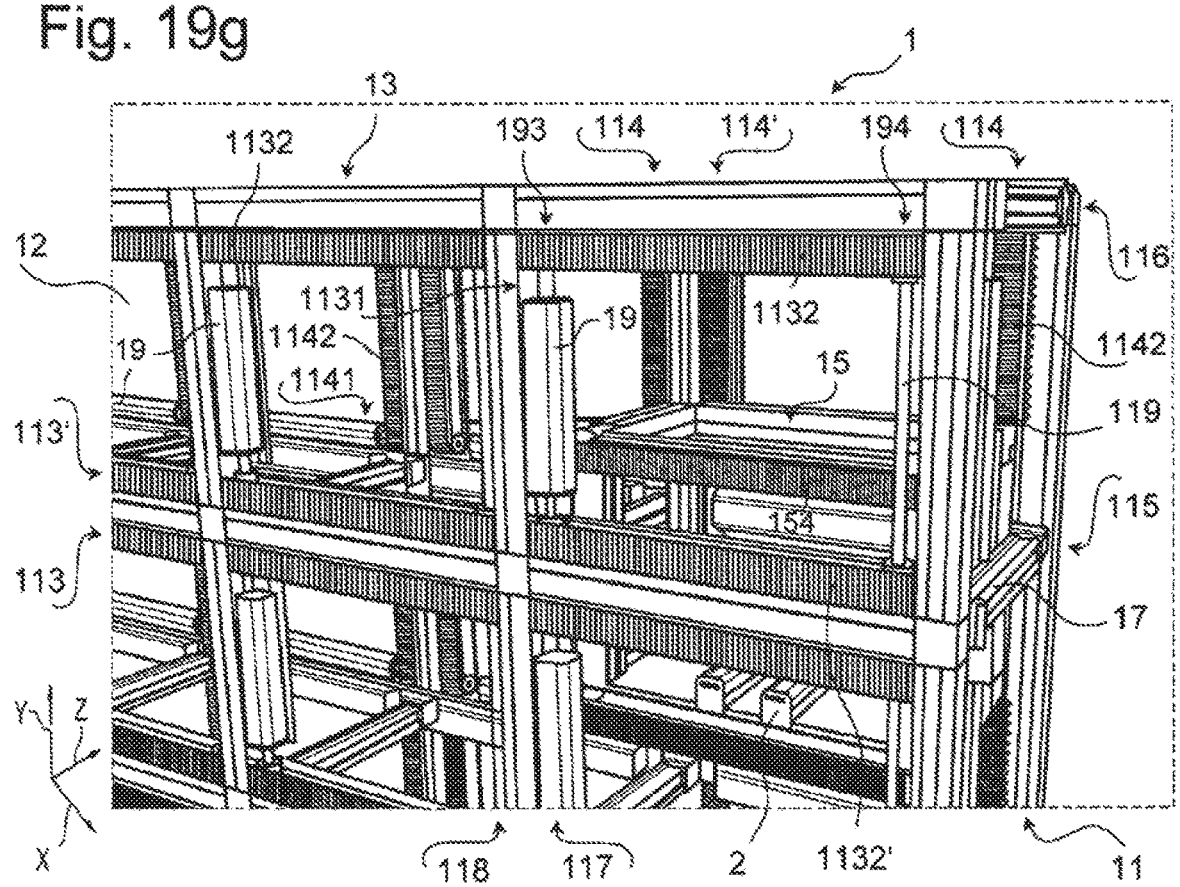

FIG. 19*g* shows the repositioning movement of the cab 15 in the vertical direction Y by means of two vertical drive tracks 114, 114', the latter being disposed so as to be opposite two guide tracks 117, 118 within the three-dimensional compartment matrix 13.

Figure 19H:
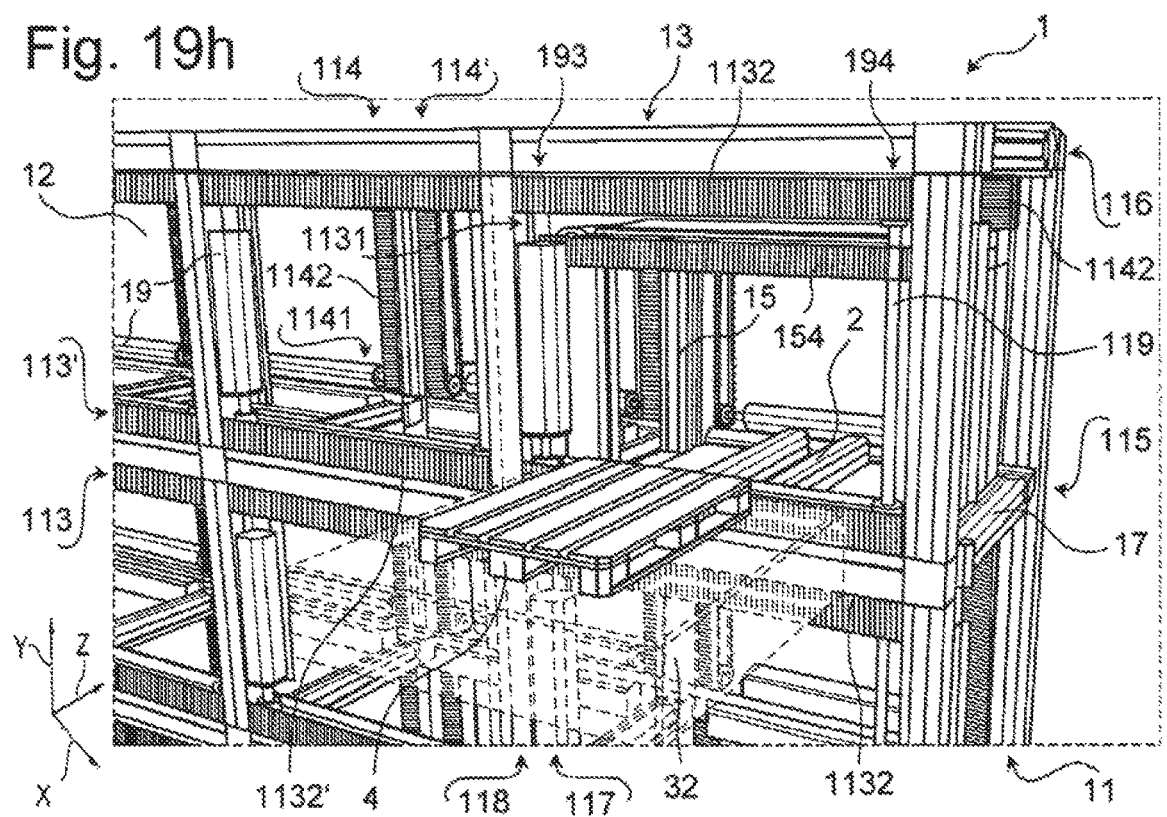

A comparatively large fragment of the storage and retrieval device 1 is finally shown again in FIG. 19*h*, in which the cab 15 has terminated the repositioning movement of the latter in the vertical direction Y and has deposited a stored goods item 4, here in an exemplary manner a Euro pallet, in a storage compartment 32 of a high-bay warehouse 3, said cab 15 now and again being in a vertical downward movement. Electromotive drives 1131 of the horizontal drive tracks 113, 113' that are in each case disposed on the left side within the frame compartments 12 and run in the vertical direction Y and comprise first electric motors 19 can be seen in this illustration. Connection shafts 119 which operatively interconnect the first timing belts 1131 of a frame compartment 12 that run so as to be mutually parallel are illustrated in each case on the right side of the frame compartments 12. On account thereof, an electromotive drive 1131 needs only to be equipped in a cost-effective manner with one drive shaft 198 of an electric motor 19 in order for a first gear wheel 193 to be driven. The kinetic energy of the electric motor 19 in this instance can be advantageously coupled, without any further requirement of synchronization, by way of second gear wheels 194 at the ends of the connection shaft 19 and be transmitted from the directly driven timing belt 1132 onto the in this instance indirectly driven timing belt 1132'. The first gear wheel 193 of the indirectly driven timing belt 1132' in this design embodiment is in this instance preferably designed so as to be decoupled from the drive shaft 198 and mounted so as to be only freely rotatable.

In an alternative design embodiment (not illustrated here) of the invention, the electric motor 19 of an electromotive drive 1131, 1141 can also have two opposite drive shafts 198, for in each case directly driving the two first timing belts 1131 of a frame compartment 12, said timing belts being oriented in the same direction, in relation to a repositioning movement in the second horizontal direction X, or for in each case directly driving the two second timing belts 1142 of a frame compartment 12, said timing belts being oriented in the same direction, in relation to a repositioning movement in the vertical direction Y.

In as far as an electromotive drive 1131, 1141 in a further alternative (not illustrated) comprises two electric motors 19 having motor shafts 195 that are aligned in a mutually opposing manner, there is in the case of this alternative a requirement for synchronization between the motor shafts 195 and/or drive shafts 198, to which end each electric motor 19 is advantageously assigned a transducer, or a comparable means, for detecting the angular position of the respective motor shaft 195 and/or driveshaft 198, for example.

The invention relates to a storage and retrieval device 1, in particular for a parallel operation of a high-bay warehouse 3, having a device frame 11 which has frame compartments 12 that are disposed so as to form a three-dimensional compartment matrix 13, and having at least one cab 15 which serves for receiving a stored goods item 4. The cab 15, electromotively driven, within the three-dimensional compartment matrix 13 is movable for repositioning from each frame compartment 12 in a vertical direction Y and/or in a second horizontal direction X. The invention furthermore relates to an operating method for such a storage and retrieval device 1.

The present invention for the first time provides a storage and retrieval device 1 which by way of the repositioning capability of at least one cab 15 within a device frame 11 of the storage and retrieval device 1 in a vertical direction Y and/or in a second horizontal direction X advantageously implements a rapid access and, on account of a parallel operation of a plurality of cabs 15, a high turnover of stored goods 4 in the operation of a high-bay warehouse 3.

LIST OF REFERENCE SIGNS

1 Storage and retrieval device
11 Device frame
111 First horizontal guide track in the X direction
112 First vertical guide track in the Y direction
113 Horizontal drive track in the X direction
113' Horizontal drive track in the X direction
1131 First electromotive drive
1132 First timing belt
1132' First timing belt
1133 First clearance
114 Vertical drive track in the Y direction
114' Vertical drive track in the Y direction
1141 Second electromotive drive
1142 Second timing belt
1142' Second timing belt
1143 Second clearance
115 Second horizontal guide track in the X direction
116 Third horizontal guide track in the X direction
117 Second vertical guide track in the Y direction
118 Third vertical guide track in the Y direction
119 Connecting shaft
12 Frame compartment
121 Measuring system
13 Three-dimensional compartment matrix from frame compartments 12
14 Loading compartment
15 Cab
p
151 Cab floor
152 First guide rod
153 Second guide rod
154 First rack
155 Second rack
157 Web
158 Position of cab 15
159 Guide wheel
16 Electrical plug connection
161 First plug of cab 15
162 Second plug/socket on frame compartment 12
163 Lifting solenoid
17 Web
18 Slot
19 Electric motor
191 Motor axis
193 Gear wheel
194 Second gear wheel
195 Motor shaft
196 Gear wheel on motor
197 Intermediate gear wheel
198 Drive shaft
2 Telescopic drive
21 Floor
22 First slide
238 Power accumulator
27 Table
3 High-bay warehouse
31 Storage frame having stored goods item
311 First side
312 Second side
313 End side
32 Storage compartment
321 Storage compartment floor
322 Stay
33 aisle
34 Conveyor belt
35 Robot
36 Three-dimensional compartment matrix from storage compartments 32
4 Stored goods item
41 Container
411 Container body
412 Container runner
413 Clearance
Z First horizontal direction
X Second horizontal direction
Y Vertical direction
RP1 Position value
RP2 Position value
L Length of floor 21
A Spacing

The invention claimed is:

1. A storage and retrieval device, comprising:
a device frame having frame compartments disposed so as to form a three-dimensional compartment matrix; and
at least one cab serving for receiving a stored goods item and being electromotively driven within said three-dimensional compartment matrix, and said cab being movable for repositioning from each of said frame compartments in a vertical direction and/or in a second horizontal direction.

2. The storage and retrieval device according to claim 1, wherein said cab within said three-dimensional compartment matrix is movable for repositioning from each of said frame compartments in the vertical direction and from at least one row of said frame compartments that in the second horizontal direction are disposed beside one another in the second horizontal direction.

3. The storage and retrieval device according to claim 1, wherein one of said device frame or said cab has:
at least one actively configured horizontal drive track that runs in the second horizontal direction;
at least one actively configured vertical drive track that runs in the vertical direction; and
wherein a respective other one of said device frame or said cab has:
a passively configured horizontal drive track that runs in the second horizontal direction; and
a passively configured vertical drive tracks that runs in the vertical direction.

4. The storage and retrieval device according to claim 3, wherein:
said actively configured horizontal and vertical drive tracks, namely each portion of said actively configured horizontal and vertical drive tracks that is delimited by a frame compartment of said frame compartments, have at least one electromotively driven timing belt; and said passively configured horizontal and vertical drive tracks, namely each portion of the passively configured horizontal and vertical drive tracks that is configured on said cab, have at least one rack for interacting with said at least one of said electromotively driven timing belt.

5. The storage and retrieval device according to claim 3, further comprising at least one first electromotive drive and at least one second electromotive drive;
wherein said actively configured horizontal drive track, namely each portion of said actively configured horizontal drive track that is delimited by a frame compartment of said frame compartments, for moving said cab for repositioning in the second horizontal direction is operatively connected directly or indirectly to said at least one first electromotive drive; and
wherein said actively configured vertical drive track, namely each portion of said actively configured vertical drive track that is delimited by said frame compartment, for moving said cab for repositioning in the vertical direction is operatively connected directly or indirectly to said at least one second electromotive drive.

6. The storage and retrieval device according to claim 5:
wherein each of said first and second electromotive drives has an externally cogged timing belt that is tensioned in a respective drive direction, said externally cogged timing belt includes a first timing belt and a second timing belt;
wherein said passively configured horizontal drive track has a first rack, and in a repositioning movement of said cab in the second horizontal direction said first rack of said passively configured horizontal drive track engages with at least one said first timing belt of said actively configured horizontal drive track;
said second timing belt of said actively configured vertical drive track in relation to a second rack are aligned so as to permit a horizontal transverse displacement;
wherein in a repositioning movement of said cab in the vertical direction a second rack of said passively configured vertical drive track engages with at least one said second timing belt of the actively configured vertical drive track and said first timing belt of said actively configured, horizontal drive tracks in relation to said first rack are aligned so as to permit a vertical transverse displacement.

7. The storage and retrieval device according to claim 1, wherein said device frame has:
a first plurality of horizontal guide tracks that run in the second horizontal direction;
a second plurality of vertical guide tracks that run in the vertical direction;
wherein said horizontal guide tracks in the vertical direction are disposed so as to be equidistant on top of one another, and/or in a first horizontal direction that is perpendicular to the second horizontal direction are disposed so as to be mutually spaced apart;
wherein said vertical guide tracks in the second horizontal direction are disposed so as to be equidistant beside one another, and/or in the first horizontal direction that is perpendicular to the second horizontal direction are disposed so as to be mutually spaced apart; and
wherein said frame compartments of said device frame are at least in part formed by means of said horizontal and vertical guide tracks.

8. The storage and retrieval device according to claim 7, wherein said cab contains:
a first guide rod that runs in the second horizontal direction;
a second guide rod that runs in the vertical direction;
wherein in a repositioning movement of said cab in the second horizontal direction said first guide rod is operatively connected to one of said first horizontal guide tracks; and
wherein in a repositioning movement of said cab in the vertical direction said second guide rod is operatively connected to one of said first vertical guide tracks.

9. The storage and retrieval device according to claim 8, wherein said device frame has:
a plurality of horizontal drive tracks that run in the second horizontal direction and in the vertical direction are disposed so as to be equidistant on top of one another and in each case so as to be between neighboring said first horizontal guide tracks; and
a plurality of vertical drive tracks that run in the vertical direction and in the second horizontal direction are disposed so as to be equidistant beside one another and in each case so as to be between neighboring said first vertical guide tracks.

10. The storage and retrieval device according to claim 5, wherein each of said first and second electromotive drives contains a linear motor each having an active primary part and a passive secondary part; and
wherein said passively configured horizontal and vertical drive tracks of said cab have said passive secondary part of a respective said linear motor, and said actively configured horizontal and vertical drive tracks of said frame compartments have said active primary part or said actively configured horizontal and vertical drive tracks of said cab have said active primary part of said respective linear motor, and said passively configured horizontal and vertical drive tracks have said passive secondary part.

11. The storage and retrieval device according to claim 1, wherein said cab has a gripper and/or a telescopic drive for transferring the stored goods item.

12. The storage and retrieval device according to claim 7, wherein:
said cab for a repositioning movement within said horizontal and vertical guide tracks contains at least one mobility means being eight guide wheels which are disposed on corners of said cab and have rotation axes that point in the first horizontal direction; and
said horizontal and vertical guide tracks are linear guide rails which have a profile that matches said mobility means formed by said guide wheels.

13. The storage and retrieval device according to claim 1, wherein a least one of said frame compartments of said device frame has a measuring system for measuring an absolute value of a repositioning movement of said cab, said measuring system is configured as an incremental transducer and a means for position determination, and/or as an absolute position measurement system.

14. A method for operating a storage and retrieval device, which comprises the steps of:
providing a device frame having frame compartments that are disposed so as to form a three-dimensional compartment matrix;
providing at least one cab serving for receiving a stored goods item and being, electromotively driven; and
moving the cab within the three-dimensional compartment matrix for repositioning from each frame compartment in a vertical direction and/or in a horizontal direction.

15. The method for operating the storage and retrieval device according to claim 14, wherein for moving the cab for repositioning within the device frame, performing the further steps of:
- determining position values of timing belts of mutually neighboring frame compartments and determining a position of the cab within the frame compartment in which the cab is currently disposed; and/or
- defining a position value of a timing belt as well as the position of the cab within the frame compartment in which the cab is currently disposed as a relative zero point; and/or
- synchronizing a further position value of the timing belt of the frame compartment that follows in a direction of the repositioning movement of the cab with the position value of the timing belt of the frame compartment in which the cab is currently disposed; and/or
- displacing the cab by a movement of the timing belt by a spacing in a direction of the repositioning movement of the cab, wherein the spacing is a spacing between centers of two frame compartments that are neighboring in the direction of the repositioning movement of the cab; and/or
- upon a transfer of the cab into the frame compartment that within the device frame follows in the direction of the repositioning movement of the cab having been performed, defining the position value of the timing belt in the frame compartment in which the cab is disposed upon having been transferred, as a new relative zero point.

* * * * *